US006791629B2

(12) United States Patent  
Moskovich et al.

(10) Patent No.: US 6,791,629 B2
(45) Date of Patent: Sep. 14, 2004

(54) LENS SYSTEMS FOR PROJECTION TELEVISIONS

(75) Inventors: Jacob Moskovich, Cincinnati, OH (US); Michael B. Larson, Amelia, OH (US); Richard J. Wessling, Milford, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 716 days.

(21) Appl. No.: 09/811,732

(22) Filed: Mar. 19, 2001

(65) Prior Publication Data

US 2003/0071929 A1 Apr. 17, 2003

Related U.S. Application Data

(60) Provisional application No. 60/247,978, filed on Nov. 9, 2000.

(51) Int. Cl.[7] .............................. H04N 9/31; H04N 5/74
(52) U.S. Cl. ...................... 348/779; 348/781; 359/649; 359/650; 359/772; 359/780
(58) Field of Search ................................. 348/779, 781, 348/744, 776, 778; 359/649, 650, 772, 780, 708, 771; 353/100; H04N 9/31, 5/74

(56) References Cited

U.S. PATENT DOCUMENTS

| 4,699,476 A | 10/1987 | Clarke |
| 4,776,681 A | 10/1988 | Moskovich |
| 4,884,879 A | 12/1989 | Fukuda et al. |
| 4,948,237 A | 8/1990 | Hirata et al. |
| 5,029,993 A | 7/1991 | Fukuda et al. |
| 5,045,930 A | 9/1991 | Hasegawa |
| 5,055,922 A | 10/1991 | Wessling |
| 5,200,814 A | 4/1993 | Hirata et al. |
| 5,293,226 A | 3/1994 | Yamamoto et al. |
| 5,537,167 A | 7/1996 | Toide et al. |
| 5,633,757 A | 5/1997 | Park |
| 5,659,424 A | 8/1997 | Osawa et al. |
| 6,301,056 B1 | * 10/2001 | Kreitzer ...................... 348/781 |
| 6,324,014 B1 | * 11/2001 | Moskovich ................. 359/649 |

FOREIGN PATENT DOCUMENTS

| JP | 06082693 A | * 3/1994 | ............ H04N/5/74 |
| JP | 09138346 A | * 5/1997 | ............ H04N/9/31 |

OTHER PUBLICATIONS

Dunham et al., "Minimax Appoximation by a Semi–Circle, "*SIAM J. Numer. Anal.*, 17:63–65, 1980.

* cited by examiner

*Primary Examiner*—Sherrie Hsia
(74) *Attorney, Agent, or Firm*—Anna A. Kobilansky

(57) ABSTRACT

Projection lens systems for use with cathode ray tube (CRT) projection televisions are provided which have positive first lens units (U1) and negative second lens units (U2) where the negative second lens units are customized in terms of at least one optical property for at least two of the colors of light produced by the CRTs with which the units are used. The at least one optical property is not spectral transmission, although the second lens units can also be customized for spectral transmission. As illustrated in FIGS. 1B–1F and FIGS. 8B–8F, such customization of a non-transmissive property provides an effective and cost effective approach for improving the color performance of CRT projection lens systems. Constructions for the positive first lens unit which improve image contrast and reduce manufacturing costs are also provided.

41 Claims, 19 Drawing Sheets

LENS SYSTEMS FOR PROJECTION TELEVISIONS

CROSS REFERENCE TO RELATED PROVISIONAL APPLICATION

This application claims the benefit under 35 USC §119(e) of U.S. Provisional Application No. 60/247,978 filed Nov. 9, 2000, the content of which in its entirety is hereby incorporated by reference.

I. FIELD OF THE INVENTION

This invention relates to projection lens systems for use in projection televisions and, in particular, to low cost, high performance projection lens systems for use in projection televisions that employ three cathode ray tubes (CRTs), e.g., a red CRT, a blue CRT, and a green CRT.

II. BACKGROUND OF THE INVENTION

There exists a need in the art for projection lens systems and, in particular, rear projection lens systems, that have some and preferably all of the following features:

(1) The systems can be produced at low cost so as to be suitable for use in high volume consumer projection television sets.

(2) The systems can accommodate the spectral differences in the light produced by the red, green, and blue CRTs without the cost and complexity associated with full color correction.

(3) The systems have an optical performance suitable for use with the higher bandwidth signals of digital televisions.

(4) The systems exhibit a high level of image contrast.

(5) The systems produce a bright image, e.g., the systems have infinite conjugate f/#'s that are less than or equal to 1.5 and preferably are around 1.0.

(6) The systems have a wide field of view in the direction of the screen so that the distance to the screen can be reduced, e.g., a half field of view in the direction of the screen of at least 35°.

(7) The systems are relatively insensitive to changes in temperature, e.g., changes between room temperature and operating temperature.

III. SUMMARY OF THE INVENTION

To satisfy this need in the art, the invention provides projection lens systems which have some and preferably all of the above seven features.

In accordance with a first aspect, the invention provides a projection lens system for use in a projection television which has a screen and a first CRT which produces light of primarily a first color, a second CRT which produces light of primarily a second color, and a third CRT which produces light of primarily a third color, said projection lens system comprising three projection lenses, one projection lens being associated with each of the CRTs during use of the system for forming an image of the light produced by that CRT on the screen, each projection lens consisting of:

(A) a first lens unit (U1) on the long conjugate side of the lens, said first lens unit having a positive power; and (B) a second lens unit (U2) which (i) is associated with a CRT during use of the lens, (ii) has a strong negative power when so associated, and (iii) provides most of the correction of the lens' field curvature;

wherein in addition to any difference based on satisfying the Scheimpflug condition (see, for example, Hasegawa, U.S. Pat. No. 5,045,930; Yamamoto et al., U.S. Pat. No. 5,293,226; and Toide et al., U.S. Pat. No. 5,537,167) or any difference in spectral transmission (see for example, Wessling, U.S. Pat. No. 5,055,922), the second lens unit of the second projection lens differs from the second lens unit of the first projection lens in at least one optical property, said difference being based on said first and second colors.

In certain preferred embodiments, in addition to any differences based on satisfying the Scheimpflug condition or any differences in spectral transmission, the second lens units of the first, second, and third projection lenses all differ from one another in at least one optical property, said differences being based on the first, second, and third colors.

In other preferred embodiments, the second lens units comprise a meniscus element and the differences between second lens units are achieved through differences, other than spectral transmission, in the meniscus elements, e.g., differences in at least one of:

(1) focal length, (2) index of refraction, (3) base radius for the screen side surfaces of the elements, (4) base radius for the CRT side surfaces of the elements, (5) difference in surface shape and/or best-fit spherical radii of the screen side surfaces for elements that have aspherical screen side surfaces, and/or (6) difference in surface shape and/or best-fit spherical radii of the CRT side surfaces for elements that have aspherical CRT side surfaces.

In accordance with other embodiments, the second lens units comprise a coupling fluid portion (e.g., a coupling fluid between a meniscus element and the faceplate of the CRT which in addition to optically coupling the lens to the CRT faceplate also functions as a cooling medium), and the differences between second lens units are achieved through differences, other than spectral transmission, in the optical properties of the coupling fluid portion of the second lens units. Such differences in the coupling fluid portion of the second lens units include differences in index of refraction of the coupling fluid produced through, for example, differences in composition and/or differences in coupling fluid temperature resulting from heating and/or cooling of one or more of the coupling fluids and/or its housing. Such differences also include differences in the shape (e.g., axial thickness and/or radii of curvature) of the coupling fluid portion. The differences in the coupling fluid portions of the second lens units can include both differences in index of refraction and differences in shape.

As another alternative for producing differences in second lens units, the optical properties, other than spectral transmission, of the faceplates of the CRTs, which form part of the second lens unit during use of the projection lens, can be made different for at least two of the CRTs, e.g., for the green and red CRTs. Such differences can include differences in thickness, index of refraction, and radii of curvature. Also in the case of CRT faceplates that include one or more aspherical surfaces, surface shape and/or best-fit spherical radii can also be made different between various of the faceplates based on color. In general, this approach of varying the faceplate is less preferred for manufacturing and cost reasons than varying the properties of a meniscus element (most preferred) or varying the properties of the coupling fluid region of the second lens unit.

In accordance with other preferred embodiments, the first lens units of the projection lenses are identical to within manufacturing tolerances. In this way, the manufacturing cost of the system can be reduced since common first lens units are used for the main, most complex part of the projection lenses while at the same time high levels of optical performance can be achieved by varying only a relatively small, simpler part (the second lens unit) of the projection lens for some or all of the different colors.

In accordance with a second aspect, the invention provides a projection lens for use in combination with a CRT and having a long conjugate side, a short conjugate side, and a focal length F0 when associated with the CRT, said lens consisting in order from its long conjugate side of:

(A) a positive first lens unit (U1) which consists in order from the lens' long conjugate side of:

(i) a first lens subunit which consists of a first lens element (L1) which has at least one aspherical surface and a weak power;

(ii) a second lens subunit (focal length=F2) which is preferably biconvex and which provides most of the positive power of the projection lens and consists of a second lens element (L2) or a doublet (DB); and (iii) a third lens subunit which consists of a third lens element (L3; focal length=F3) which has at least one aspherical surface and a positive power; and (B) a second lens unit (U2; focal length=F4) which (i) is associated with the CRT during use of the lens, (ii) has a strong negative power when so associated, and (iii) provides most of the correction of the lens' field curvature;

wherein:

(a) the first lens element has a best-fit spherical radius R11 in the direction of the lens' long conjugate side and a best-fit spherical radius R12 in the direction of the lens' short conjugate side;

(b) the second lens subunit has a radius R21 in the direction of the lens' long conjugate side and a radius R22 in the direction of the lens' short conjugate side;

(c) the second lens subunit is axially spaced from the third lens element by a distance T23;

(d) the third lens element has an axial thickness T3, a best-fit spherical radius R31 in the direction of the lens' long conjugate side, and a best-fit spherical radius R32 in the direction of the lens' short conjugate side; and (e) the third lens element is axially spaced from the second lens unit by a distance T34;

and wherein the projection lens has some and preferably all of the following characteristics:

(i) $|R22|/R21 \geq 1.5$ (or $\geq 2.0$ or $\geq 2.5$);

(ii) $R31 < 0$;

(iii) $R32 < 0$;

(iv) $|R31| > |R32|$;

(v) $T3/F0 \leq 0.13$ (or $\leq 0.1$);

(vi) $T23 \leq T34$;

(vii) $T23 \geq 0.15$ F0;

(viii) $R11 > 0$;

(ix) $R12 > 0$;

(x) $R11 > R12$;

(xi) $F0/F2 \geq 0.9$;

(xii) $F0/F3 \leq 0.42$ or ($\leq 0.4$ or $\leq 0.3$);

(xiii) $0.64 \leq F0/|F4| < 0.85$ (or $0.75 < F0/|F4| < 0.85$); and/or (xiv) the second lens unit comprises a meniscus element which is concave (preferably, strongly concave) to the lens' long conjugate side.

Characteristics (ii) and (iii) mean that L3 when described in terms of best-fit spherical radii has a meniscus shape convex towards the short conjugate side of the projection lens, while characteristics (viii) and (ix) mean that L1 when described in terms of best-fit spherical radii has a meniscus shape convex towards the long conjugate side of the projection lens.

In certain preferred embodiments of this aspect of the invention, the projection lens has a half angle field of view in the direction of the lens' long conjugate of at least 35 degrees (e.g., greater than or equal to 37° as in Examples 1–8 below). In other preferred embodiments, the projection lens has an f-number for an infinite conjugate of less than 1.5 and preferably ~1.0.

In still further preferred embodiments, the second lens subunit is composed of glass (or, more generally, a thermally stable material) and the first lens element, the third lens element, and the meniscus element of the second lens unit (when used) are composed of plastic. This choice of materials provides a number of advantages to the projection lens.

First, it makes the lens inexpensive to manufacture. As discussed below and illustrated in the examples, the plastic elements of the lens have configurations which allow them to be readily molded in plastic. As also illustrated in the examples, the second lens element (L2) or doublet (DB) used for the second lens subunit has spherical surfaces which allow these components to be readily made in glass. Accordingly, each of the components of the lens can be readily manufactured at low cost.

Second, the plastic-glass-plastic construction of the lenses of the invention, with the glass portion being of strong power, makes the lenses insensitive to changes in temperature. Also, a third lens element (L3) which is composed of plastic and has a positive power provides compensation for changes in temperature of the second lens unit, specifically, changes in temperature of the coupling fluid normally used in that unit and its housing which occur as the unit heats up from room temperature to operating temperature. Again, this thermal stability is achieved for a projection lens that has both a high level of optical performance and a low cost.

In accordance with a third aspect of the invention, the projection lenses of the second aspect of the invention are used in the projection lens systems of the first aspect of the invention.

When the above aspects and preferred characteristics of the invention are used in combination, each of the seven desired features for CRT projection televisions, listed above, are achieved by the projection lens systems/projection lenses of the invention.

As used herein, the term "weak" means an element, unit, or subunit whose focal length has a magnitude which is at least about 8 times the effective focal length of the entire projection lens, and the term "strong" means an element, unit, or subunit whose focal length has a magnitude which is less than about 2.5 times the effective focal length of the entire lens system. Also, the effective focal length of the entire projection lens, as well as the effective focal length of the second lens unit, are determined for the projection lens associated with the CRT and includes the optical properties of the CRT's faceplate.

As used herein, the term "projection television" includes televisions and monitors, e.g., computer monitors.

As used herein, the term "best-fit spherical radius" means the radius determined for a surface by fitting the surface with a best fit sphere in accordance with the procedures described in Dunham et al., "Minimax Approximation by a Semi- Circle," *SIAM J. Numer. Anal.*, 17:63–65, 1980. For a spherical surface, the best-fit spherical radius and the base radius (radius at the optical axis) are identical. For an aspherical surface, the best-fit spherical radius and the base radius will in general be different.

IV. BRIEF DESCRIPTION OF THE DRAWINGS

Figure 1A:
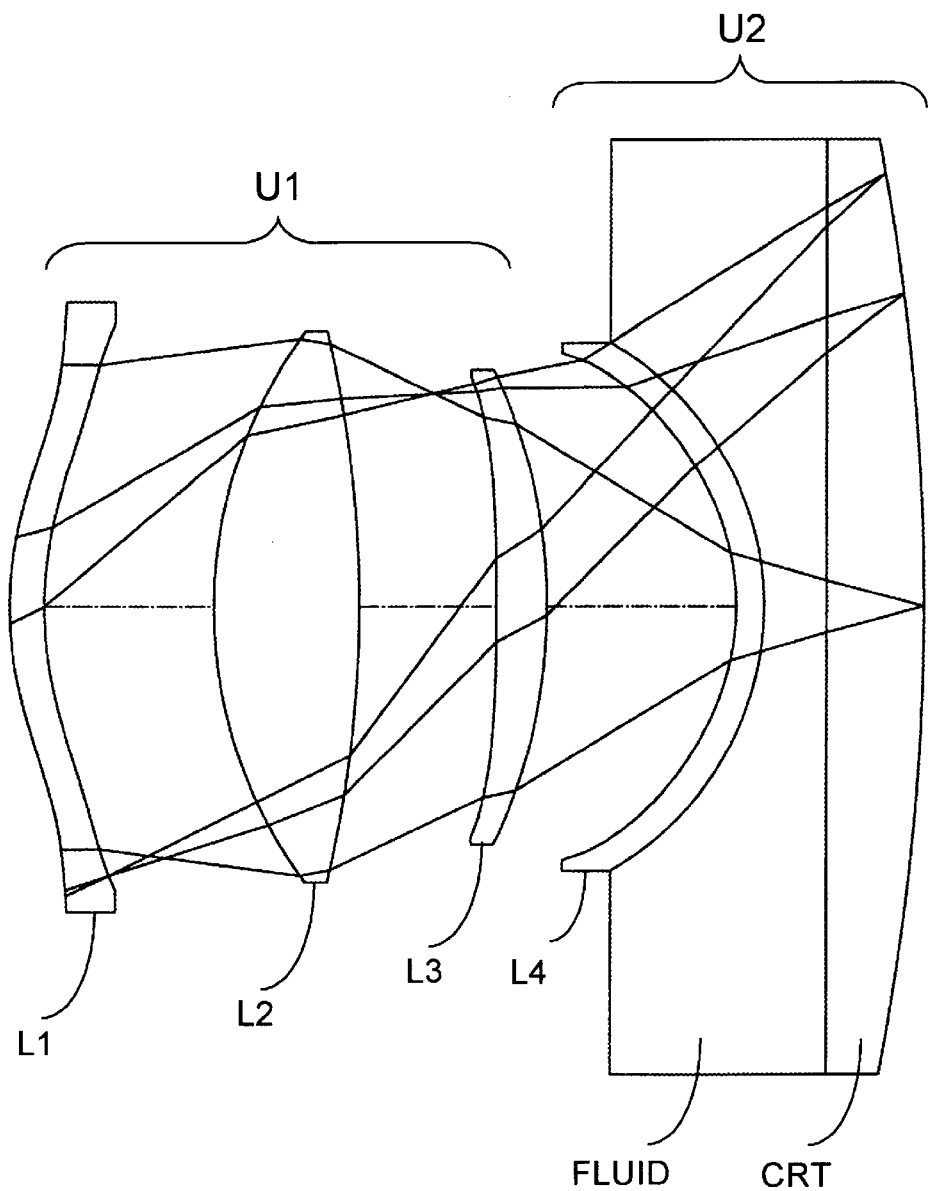
FIG. 1A is a schematic side view of a lens system constructed in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

V. DETAILED DESCRIPTION OF THE INVENTION

As discussed above, the present invention in accordance with its preferred embodiments provides four component projection lenses for use in projection televisions (PTVs). The four components are organized into two lens units (U1 and U2), the first unit (U1) having a positive power and containing three of the four components (i.e., L1, L2 or DB, and L3), and the second unit (U2) having a negative power and containing the fourth component (i.e., L4). Preferably, the four components comprise three plastic elements (L1, L3, and L4) and a glass singlet (L2) or glass doublet (DB). The four component projection lenses of the invention have improved optical performance and manufacturability compared to prior four component systems, e.g., the projection lenses of commonly assigned U.S. Pat. No. 4,776,681 (referred to in Tables 9–11 as "'681").

A. Optical Performance

1. Compensation For Variations In Aberrations With Color

To control their cost, four element lenses used in high volume consumer PTV sets designed to display NTSC signals are not normally corrected for color. Because such lenses are not color corrected, their focal length and first order properties, as well as their monochromatic aberrations, vary with color. As a result, when such lenses are used to display higher bandwidth signals such as those of digital TVs, the images formed by the lenses associated with the red and blue CRTs are not as good as that formed by the lens associated with the green CRT.

Various approaches have been considered in the art to address this problem of differences in performance with color. At one extreme, fully color corrected lenses have been used, but this is a fairly expensive proposition not suitable for mass market products. Partial correction of chromatic aberrations resulting from the spectral spread of the phosphors used in CRTs has been addressed by using L4 elements which operate as filters to minimize spectral spread and improve color purity. Such elements have most typically been used with the green CRT. See Wessling, U.S. Pat. No. 5,055,922.

Note that this filtering approach can be used in combination with the color correcting techniques of the present invention. In a manufacturing setting, such filtering has the advantage of providing a simple means for identifying second lens units by their spectral transmission properties, e.g., the second lens unit for the green CRT can have a green-colored lens element, the second lens unit for the red CRT can have a red-colored element, and the second lens unit for the blue CRT can have a clear element.

As discussed above, in some embodiments of the invention, only two optically different second lens units are used as opposed to three optically different second lens units, e.g., the blue second lens unit is different from the red and green second lens units, which are the same as each other. Although only two lens elements having different spectral transmission properties are sufficient to distinguish the second lens units in such a case, in practice three lens elements with different spectral transmission properties will typically be used. This is so because the green projection lens is normally most in need of filtering and a green-colored lens element generally cannot be used with the red projection lens.

Thus, for purposes of avoiding confusion in a manufacturing setting, the blue second lens unit needs to have a spectral transmission different from the green and red second lens units, and for purposes of filtering, the green and red second lens units need to have different spectral transmissions. As a result, three different spectral transmissions for the second lens units of the red, green, and blue projection lenses will typically be used, e.g., a green-colored lens element (L4 element) for the green projection lens, a red-colored lens element (L4 element) for the red projection lens, and a clear lens element (L4 element) for the blue projection lens. (A clear, rather than blue-colored, L4 element is preferred for the blue projection lens because the blue CRT does not particularly need filtering and because it is generally preferred to maximize the amount of blue light which reaches the screen of a projection television.)

Along the same lines as the use of a filter for the green CRT, it has been proposed to use projection lenses of higher optical quality for the green CRT. See Hirata et al., U.S. Pat. No. 5,200,814 (five element projection lens used for the green CRT; four element lenses used for the red and blue CRTs) and Osawa et al., U.S. Pat. No. 5,659,424 (crown glass used for the L2 element of at least the green CRT; flint glass used for the L2 element of at least the red CRT).

The change in the focal length of a lens with color means that the field curvature (Petzval curvature) of the lens, being a function of the power of the lens, changes. This change in the field curvature can be noticeable, causing degradation in the image quality when a lens designed for a green CRT is used with red and/or blue CRTs (see the discussion of FIGS. 1B–1F and 8B–8F below).

In accordance with the invention, it has been discovered that by adjusting the power of the field flattener for each of the "red" and "blue" lenses, it is possible to achieve as flat an image in the red and blue channels as in the green channel. This adjustment can be accomplished by, for example, changing one of the base radii of the unit that provides a major contribution to the correction of the field curvature of the lens, i.e., the second lens unit (U2). As discussed above, other changes can be made to the second lens unit to achieve this improved field flattening for the "red" and "blue" lenses.

If necessary, residual variations of astigmatism and other aberrations with color can be further reduced by including an aspherical surface in the second lens unit and adjusting the degree of asphericity of that surface for the "red" and "blue" lenses compared to the "green" lens.

By means of this approach, a projection TV system using three monochromatic lenses, each adjusted for its own primary color, is capable of displaying a digital TV signal with a high degree of fidelity.

It should be noted that although it is preferred to adjust the second lens units of both the "red" and "blue" lenses, the second lens unit of only one of these lenses, e.g., the "red" lens, can be adjusted if desired. This, of course, will in general provide less improvement to the overall image than that achieved when the second lens units of both the "red" and "blue" lenses are adjusted.

2. Partially Color Corrected Lenses

A further improvement in the image quality provided by the projection lens can be achieved by correcting the lens for axial color. Achieving a full color correction over a visible spectrum for a 70–80 mm focal length ~f/1 lens is not simple. Fortunately, in accordance with the invention, it has been discovered that such full color correction is not necessary.

Rather, the image quality requirements for HDTV applications are such that a partial color correction over the spectrum of the green CRT phosphor can be sufficient to achieve a significant improvement in the optical performance of the lens. Reducing the axial color to about 30% of that of a lens not corrected for color brings the image quality to a level from which any additional correction of color is not particularly noticeable to the user but requires a significant increase in the complexity and the cost of the lens.

A correction of axial color to the extent mentioned above can be accomplished fairly economically by the use of a cemented doublet (DB) instead of a single glass power element (L2). The color correcting doublet preferably consists of a positive biconvex element on the long conjugate side followed by a meniscus negative element convex to the short conjugate side. To minimize aberrations and to reduce the sensitivities to manufacturing errors, the doublet components are preferably cemented to each other.

It should be noted that since the color correction is not full, it is still beneficial to have individual red and blue CRT lenses adjusted for change in the Petzval curvature, as described in the previous section. The color correcting doublet can be used in the "green" lens only or in the "green" lens and one or more of the "red" and "blue" lenses as desired.

3. Image Contrast

One of the most important characteristics of the quality of the image of a projection TV set is contrast. Some of the factors affecting image contrast are: (1) aberrations of the lens, which affect a local area contrast close to the transition from light to dark areas, and (2) ghosts, internal reflections, scattering, veiling glare, etc., which affect the broad area contrast. To faithfully reproduce video images it is very important to have a broad dynamic range of light intensities on screen. Any non-image forming light getting to the screen will cause lower contrast. Low contrast results in black looking like gray, the overall image looking flat, and the loss of details in the shadows.

A typical configuration for a fast, wide angle lens used for projecting light produced by a CRT has a strong negative power lens unit (U2) in contact with the CRT preceded by a positive aspherical element (L3). A bright self-luminous image formed on the CRT phosphor surface is projected towards the screen. Some of that light will reflect off of the surfaces of the projection lens and may get back to the CRT faceplate.

If a lens surface is conjugate or close to being conjugate with the faceplate, the reflected light may form a bright ghost image on the phosphor surface of the CRT. That ghost may then be re-imaged all the way to the screen, resulting in an observable secondary "ghost" image. More often than not, the light reflected off of the lens surfaces does not form a recognizable image in the vicinity of the CRT faceplate, but simply adds to the noise or the overall level of brightness of the phosphor surface. It is that noise level that must be controlled to keep the broad area contrast losses to a minimum.

In addition to the use of antireflection coatings, it is important to assure that the surfaces closest to the CRT faceplate do not form any ghost images anywhere near the CRT phosphor. Keeping the overall shape of surfaces near the CRT convex to the CRT faceplate assures that any image formed by the light reflected from these surfaces will be formed far away from the phosphor surface of the CRT.

It is also helpful to keep the surfaces sending the reflected light back to the CRT as far away as possible from the CRT. However, the aspherical lens element preceding the negative power field flattener cannot be placed too close to the main power group or else it will not be able to provide a sufficient degree of correction of off-axis aberrations.

Characteristics (ii), (iii), (iv), (vi), and (vii) above address the various aspects of this problem of image contrast, while also providing a positive L3 element which compensates for changes in the optical properties of the second lens unit (U2) with temperature.

B. Lens Manufacturability

A major factor contributing to the cost of plastic optics is the "cycle time," i.e., the time between the moment a raw plastic material is injected into a mold and the moment a finished element is taken out of the mold. The shorter the time the larger the number of parts that can be produced in a given period of time.

One of the main factors determining the required cycle time is the volume of the plastic material in a lens element. Smaller volumes require shorter cooling times in the mold for the element. Therefore, using the thinnest possible lens elements will minimize the volume and mass of plastic material and thus reduce the cycle time required to mold the element.

However, simply making the elements thin is not sufficient in itself. The cycle time is also strongly affected by the requirement that the final shape of an optical element needs to fall within a very tight range of manufacturing tolerances for the final projection lens to meet its optical performance requirements.

Usually, due to shrinkage properties of plastic materials, longer cooling periods result in better conformance of the surface shape of the finished element to the surface shape of the mold. To minimize the cooling period it is desirable to have a plastic part with as uniform a distribution of mass as possible to assure an even temperature gradient and a uniform shrinkage throughout the part. This means that it is desirable to reduce as much as possible the variation of thickness across the diameter of an element.

In addition, more complicated surface shapes affect the uniformity of the temperature gradient distribution across an element, and require longer cycle times to achieve shape conformance specifications. Consequently, elements with smoother, more monotonic surface shapes are easier to make at a faster rate, resulting in reduced costs.

Characteristics (ii), (iii), (iv), (v), (viii), (ix), (x), and (xii) above address various aspects of this problem of lens manufacturability.

C. Lens Architecture

As discussed above, the projection lenses of the preferred embodiments of the invention consist of four components, i.e., from long conjugate to short, a first component (L1) of a weak optical power having at least one aspherical surface, a second biconvex component (L2 or DB) of positive power providing most of the power of the lens and made of a thermally stable material, usually glass, a third component (L3) of positive power having at least one aspherical surface, and a fourth component (U2) of negative power which includes a coupling/cooling fluid sandwiched between an outer element on the long conjugate side and a CRT faceplate, where the leading air-glass surface of the outer element is strongly concave towards the long conjugate.

In the above described lens, it is important for the second component to provide most of the positive power of the lens as a whole, to minimize the variation of the focal length of the lens due to refractive index change with temperature. The first and the third components serve to correct aberrations and therefore include aspherical surfaces.

As discussed above, to minimize the chance of undesirable secondary reflections reaching back to the CRT phosphor, it is helpful to keep the surfaces sending the reflected light back to the CRT as far away from the CRT as possible. However, the aspherical third component cannot be placed too close to the main power component or else it will not be able to provide a sufficient degree of correction of off-axis aberrations.

Since most of the economical processes used to manufacture aspherical surfaces involve plastics, the aspherical elements are made out of plastic. In practice, the coupling structure that holds the lens next to the CRT undergoes some expansion. To compensate for variations in the CRT faceplate position associated with that expansion, the third component should have some finite positive power. Then, as temperature rises, the index of refraction of that element changes, increasing the focal length of that element and the back focal distance of the lens as a whole. This change counteracts the change in the relative position of the CRT due to the expansion of the coupler. The fourth component (U2) has a strong negative power, providing a major contribution to the correction of the field curvature of the lens.

The second component (L2 or DB) has only spherical surfaces, and the axial beam uses the full diameter of that component, which makes this component a major contributor to the axial spherical aberration of the lens. To minimize the spherical aberration contributions from this component, the surface on the long conjugate side has a radius of curvature at least 1.5 times shorter than the radius of curvature on the opposite side of the component. In this way, the first component does not have to "work" as hard to correct spherical aberration which means that it can be made smoother and thus easier to make. (Characteristics (i), (viii), (ix), and (x) above relate to this feature of the invention.) The aperture stop of the lens is in the vicinity of the second component.

It is always easier to make and test spherical surfaces than aspherical surfaces. In general, for ease of manufacturing, it is desirable to have smooth surfaces that do not change drastically across the aperture of the element. To describe the shape of the aspherical surface it is convenient to use the concept of the best-fit spherical surface.

Aspherical surface profiles that change monotonically from the best-fit spheres or have a minimum of deflection points in whose proximity changes in sag occur slowly allow for easier, faster, and more accurate manufacturing of molds used to make the elements, as well as improved elements made using the molds.

To achieve these conditions, the first and third components should have an essentially meniscus shape convex to the long and to the short conjugate, respectively. When the angle of incidence of a ray on a surface is zero, i.e., the ray is normal to the refracting surface, the ray is not aberrated. Light bundles converge towards the aperture stop of the lens from one conjugate and diverge towards the opposite conjugate.

Therefore, meniscus elements concave to the stop and placed on each side of the aperture stop will have light bundles from all field points that pass through the elements at fairly close to normal angles and will introduce minimal aberrations. When the surfaces of these elements are aspherical, their corresponding profiles are preferably smooth and have no more than one inflection point where local curvature, or the second derivative, changes sign.

Another advantage of using meniscus elements is that they can be made thin, while preserving a required minimum edge thickness and a minimal variation of thickness across the diameter of the element. This, in turn, reduces the material mass and shortens the cycle time required to mold the element.

When described in terms of best-fit spherical surfaces, in the examples shown below, the first component has a meniscus shape convex to the long conjugate with the first radius of curvature being longer than the second, and the third component has a meniscus shape convex to the short conjugate, and the first radius of curvature is also longer than the second. Characteristics (ii), (iii), (iv), (viii), (ix), and (x) above set forth these desired features of the first and third components of the projection lenses of the invention.

D. Examples

FIGS. 1A, 2–7, and 8A illustrate various projection lenses constructed in accordance with the invention. Corresponding prescriptions appear in Tables 1, 1B, 1R, 2–8, 8B, and 8R. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero for all of the prescriptions of Tables 1, 1B, 1R, 2–8, 8B, and 8R.

The designation "a" associated with various surfaces in the tables represents an aspheric surface, i.e., a surface for which at least one of D, E, F, G, H, or I in the above equation is not zero. The tables are constructed on the assumption that light travels from left to right in the figures. Similarly, the sign convention used in this specification and in the claims assumes that light travels from left to right in the figures. In actual practice, the viewing screen will be on the left and the CRT will be on the right, and light will travel from right to left.

The CRT faceplate constitutes surfaces 11–12 in Tables 1, 1B, 1R, and 2–5, and surfaces 12–13 in Tables 6, 7, 8, 8B, and 8R. The coupling fluid is located between surfaces 10–11 in Tables 1, 1B, 1R, and 2–5, and surfaces 11–12 in Tables 6, 7, 8, 8B, and 8R. The material designation for the CRT faceplate and the coupling fluid is set forth as a six digit number in the tables, where an $N_e$ value for the material is obtained by adding 1,000 to the first three digits of the designation and dividing the result by 1,000, and a $V_e$ value is obtained from the last three digits by placing a decimal point before the last digit. Surfaces 3 and 6 in Tables 1, 1B, 1R, and 2–5, and surfaces 3 and 7 in Tables 6, 7, 8, 8B, and 8R are vignetting surfaces. All dimensions given in the prescription tables are in millimeters.

The plots of FIGS. 1B–1F and FIGS. 8B–8F show the through-focus MTF on the left and the optical transfer function (OTF) at best axial focus on the right. The data are shown for five field points, viz., the axis, 0.35H, 0.70H, 0.85H and 1.0H, where H is the maximum field height on the screen. The actual field heights are shown for the right hand plots. These field heights apply to both the right hand and left hand plots and are in millimeters.

The through-focus data are at the indicated spatial frequency in cycles per millimeter, i.e., at 3 cycles/mm. Both the through-focus and best-focus data indicate tangential (solid curves) and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure. The axial focus shift indicated above the best-focus plots is relative to the zero position of the through-focus plots. The best-focus plane is at the peak of the axial through-focus plot.

Figure 1B:
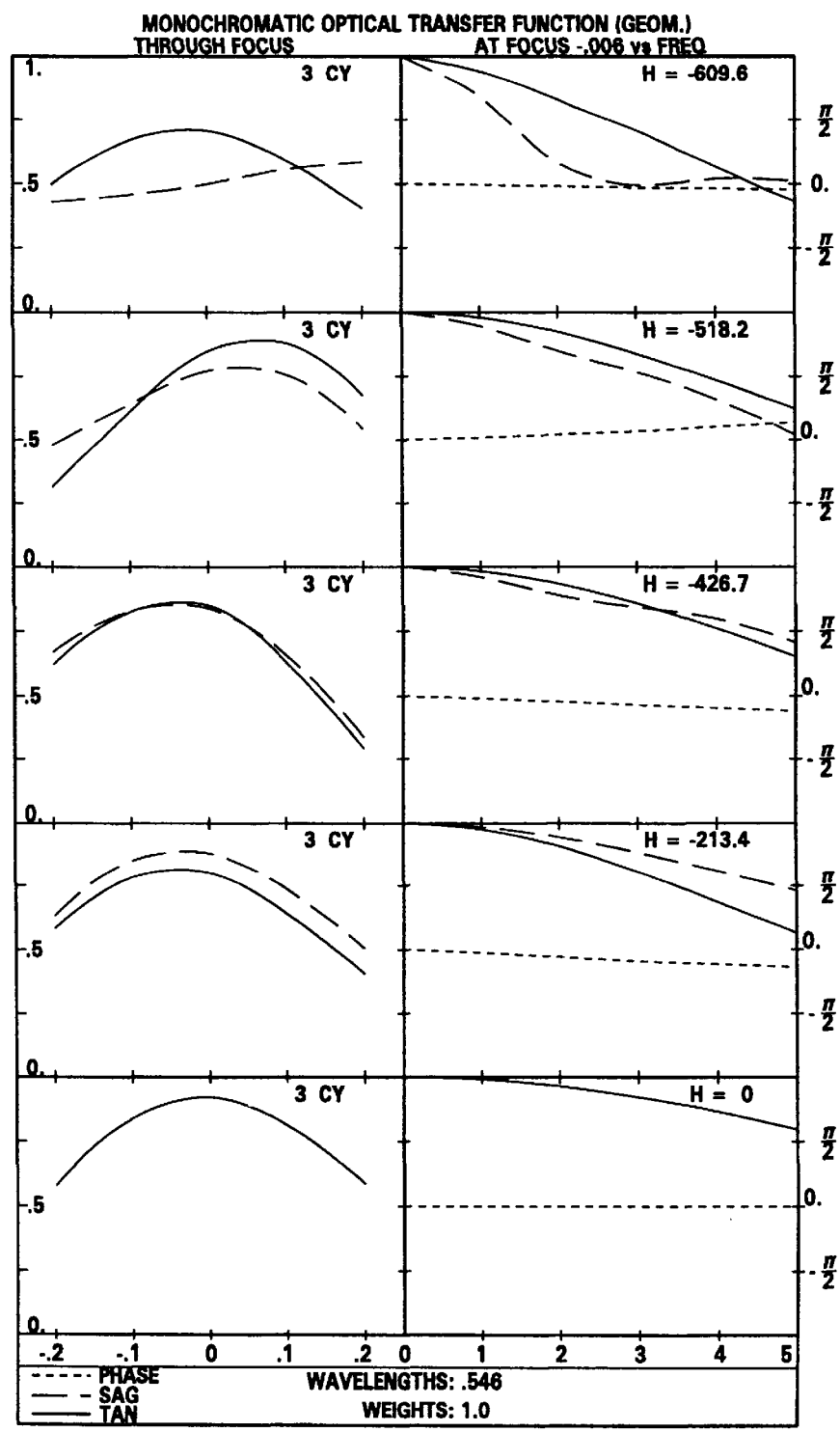
FIG. 1B is a MTF/OTF plot for the prescription of Table 1 when used with green light ($\lambda$=546 nm).
Figure 1C:
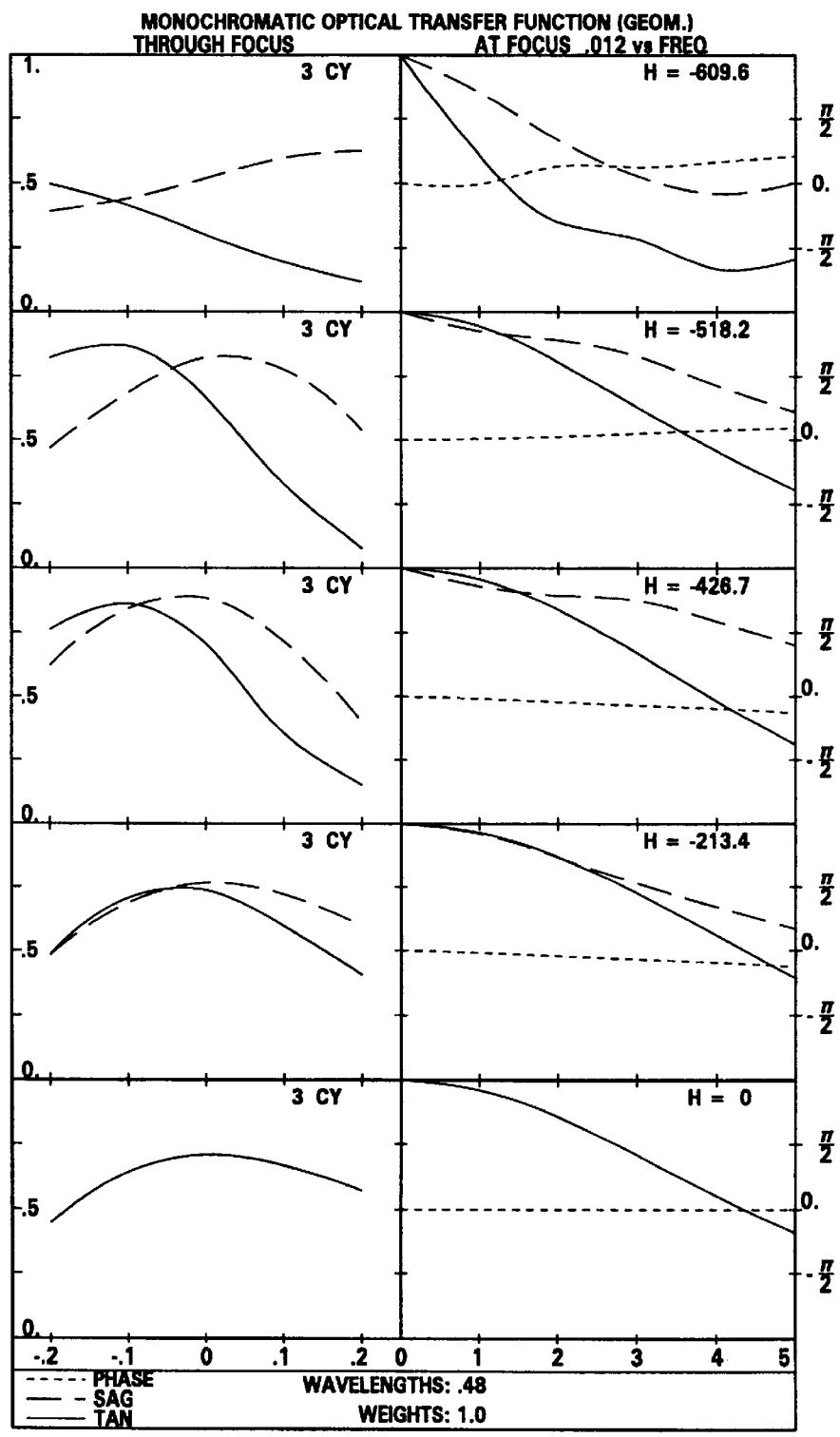
FIG. 1C is a MTF/OTF plot for the prescription of Table 1 when used with blue light ($\lambda$=480 nm).

FIG. 1B shows the MTF/OTF performance of the prescription of Table 1 when used with green light, i.e., the light it was designed to be used with. FIG. 1C shows the MTF/OTF performance when the same prescription is used for blue light after having been refocused for use with that light as is conventionally done for projection lenses used with CRTs. The degradation in performance is evident.

Figure 1D:
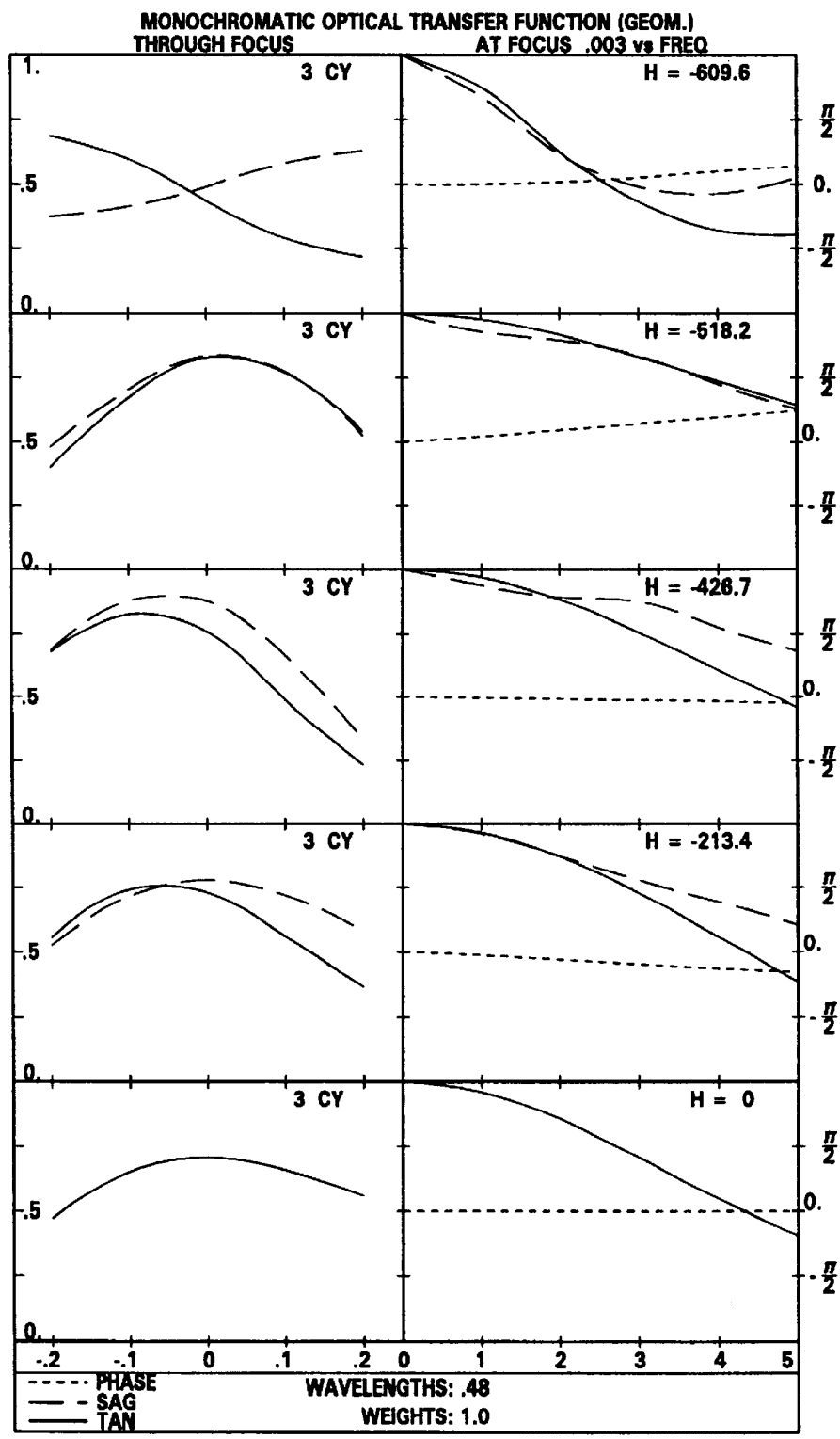
FIG. 1D is a MTF/OTF plot for the prescription of Table 1B when used with blue light ($\lambda$=480 nm).

FIG. 1D shows the MTF/OTF performance when the prescription of Table 1B is used for blue light. This prescription differs from that of Table 1 in that the lens has been refocused for blue light and then re-optimized for that light subject to the constraint that the first lens unit (U1) is unchanged. The improvement in performance compared to FIG. 1C is evident.

Figure 1E:
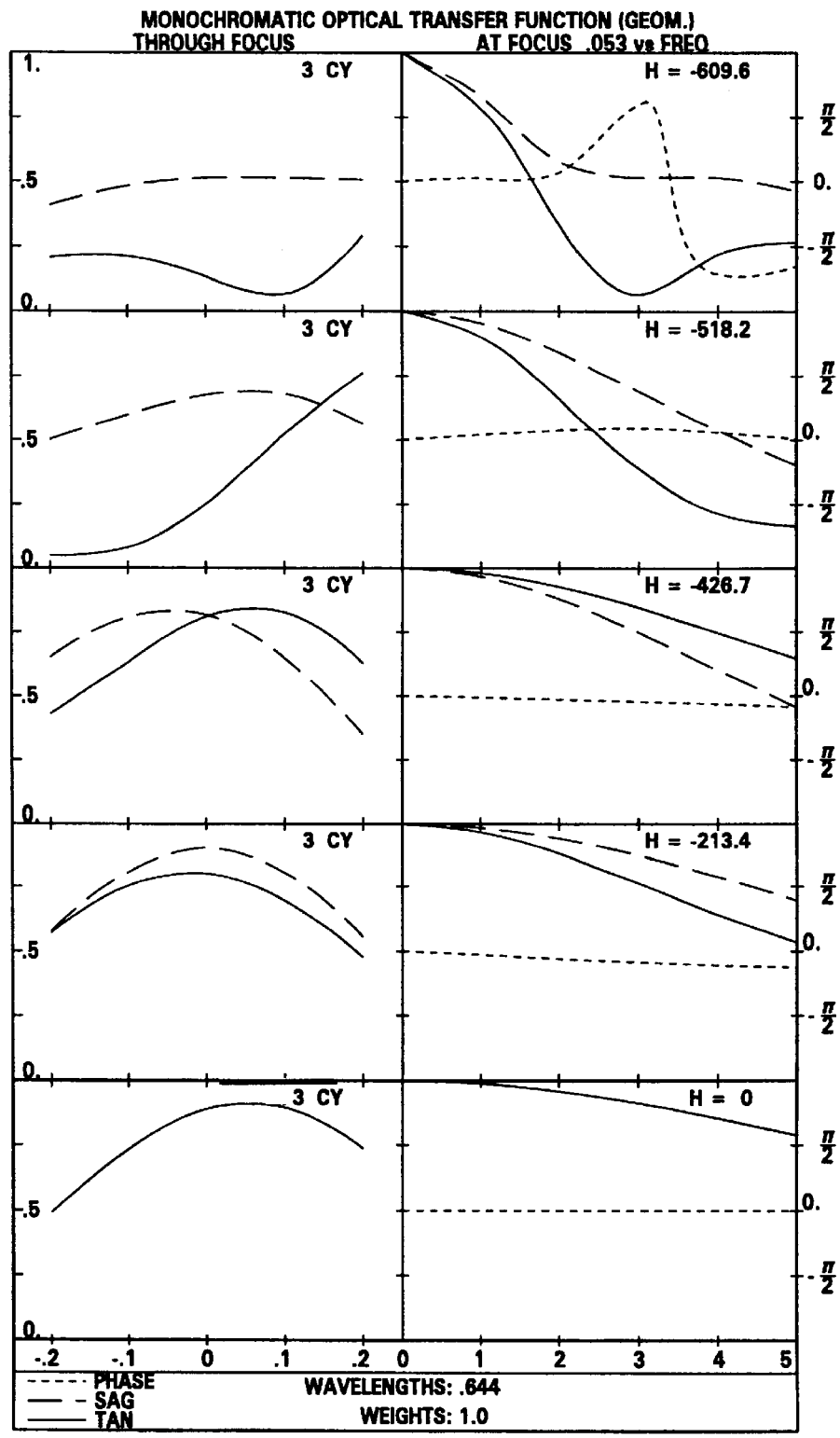
FIG. 1E is a MTF/OTF plot for the prescription of Table 1 when used with red light ($\lambda$=644 nm).
Figure 1F:
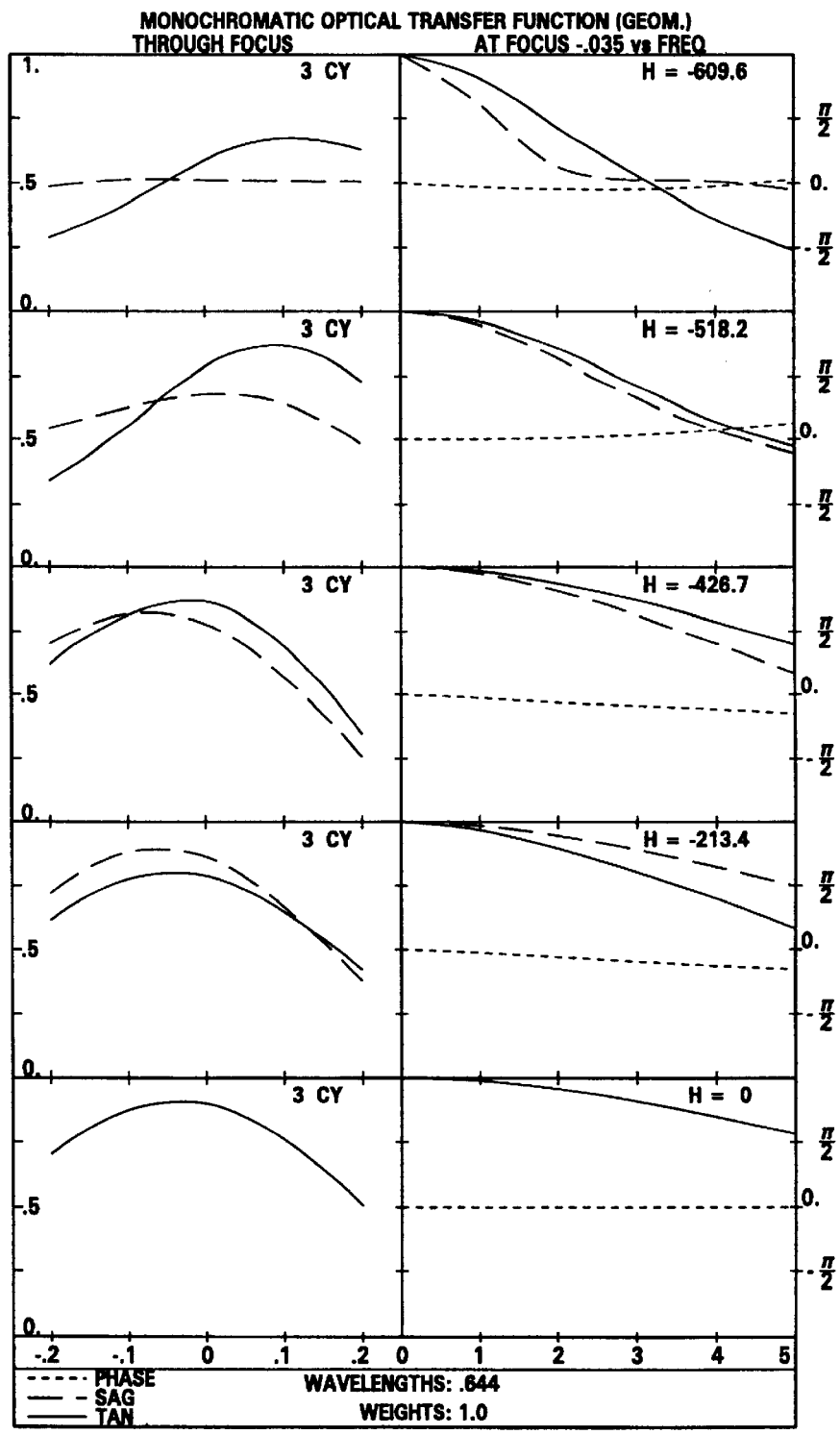
FIG. 1F is a MTF/OTF plot for the prescription of Table 1R when used with red light ($\lambda$=644 nm).
Figure 2:
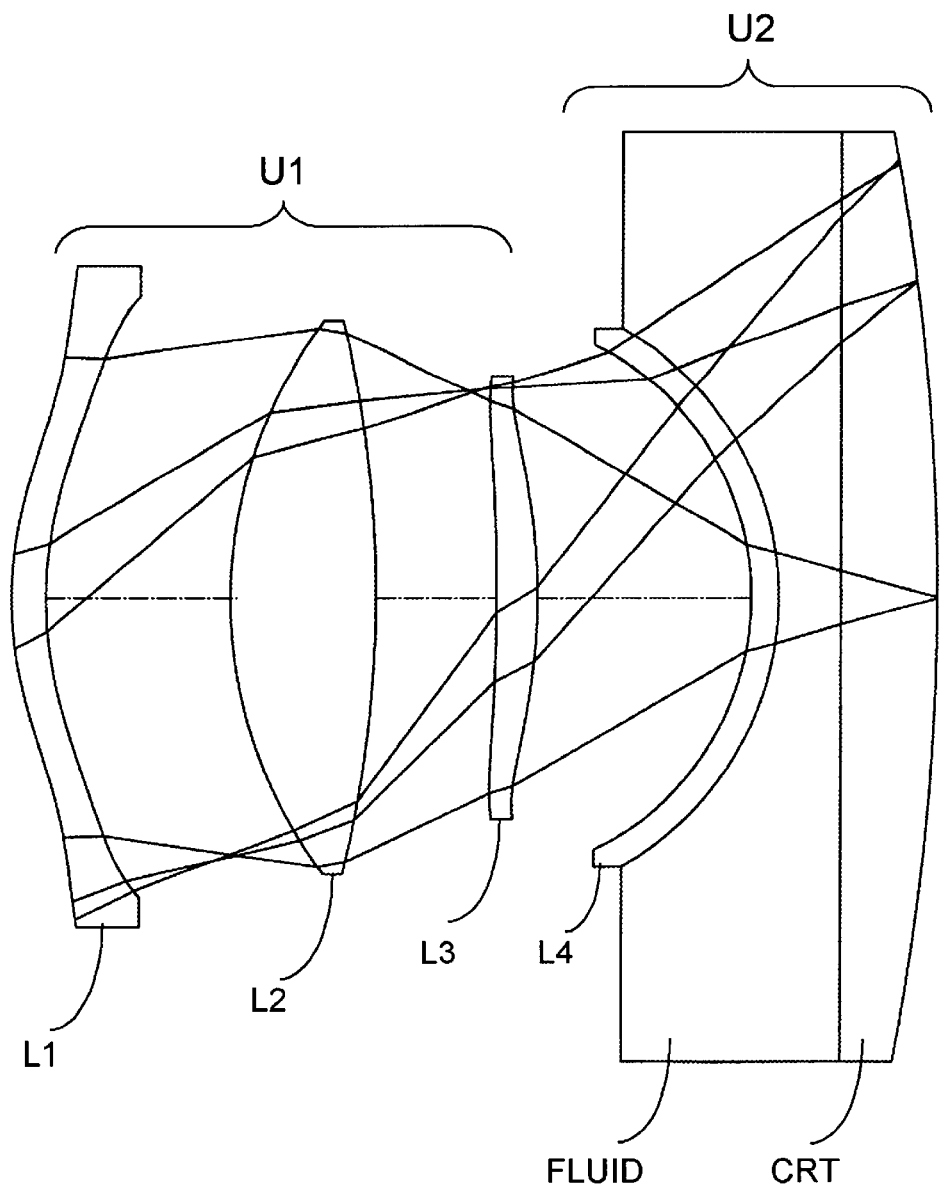
FIGS. 2–7 are schematic side views of lens systems constructed in accordance with the invention.
Figure 3:
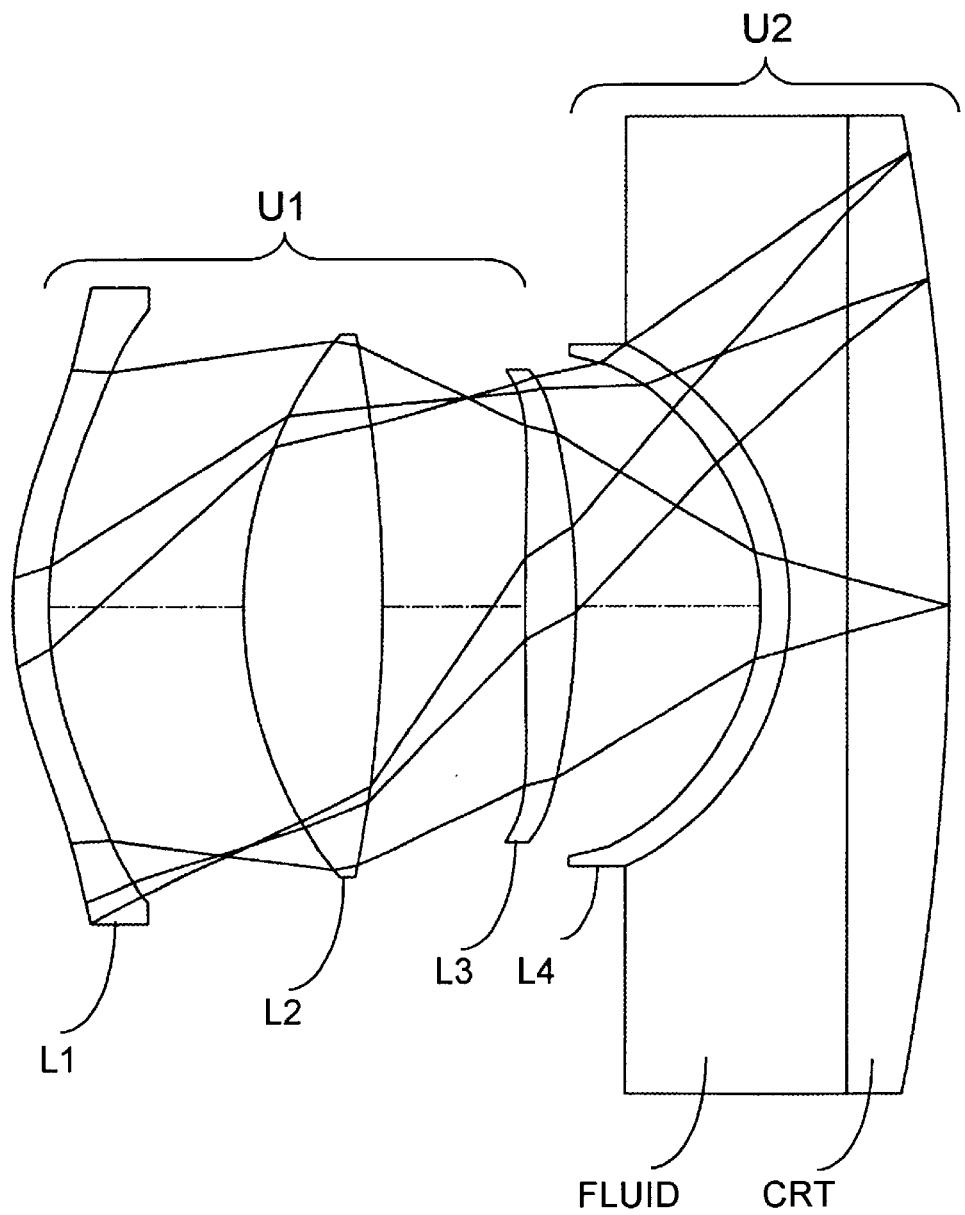
Figure 4:
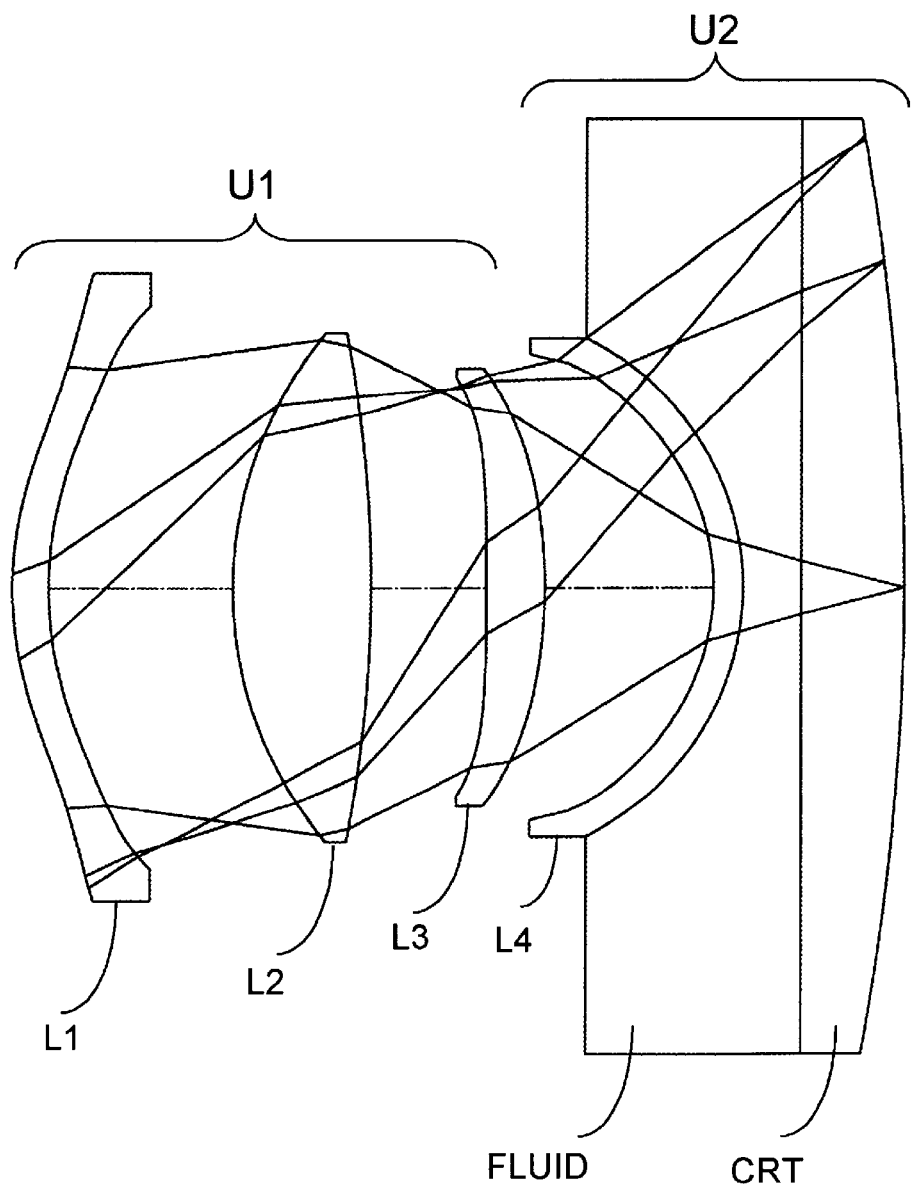
Figure 5:
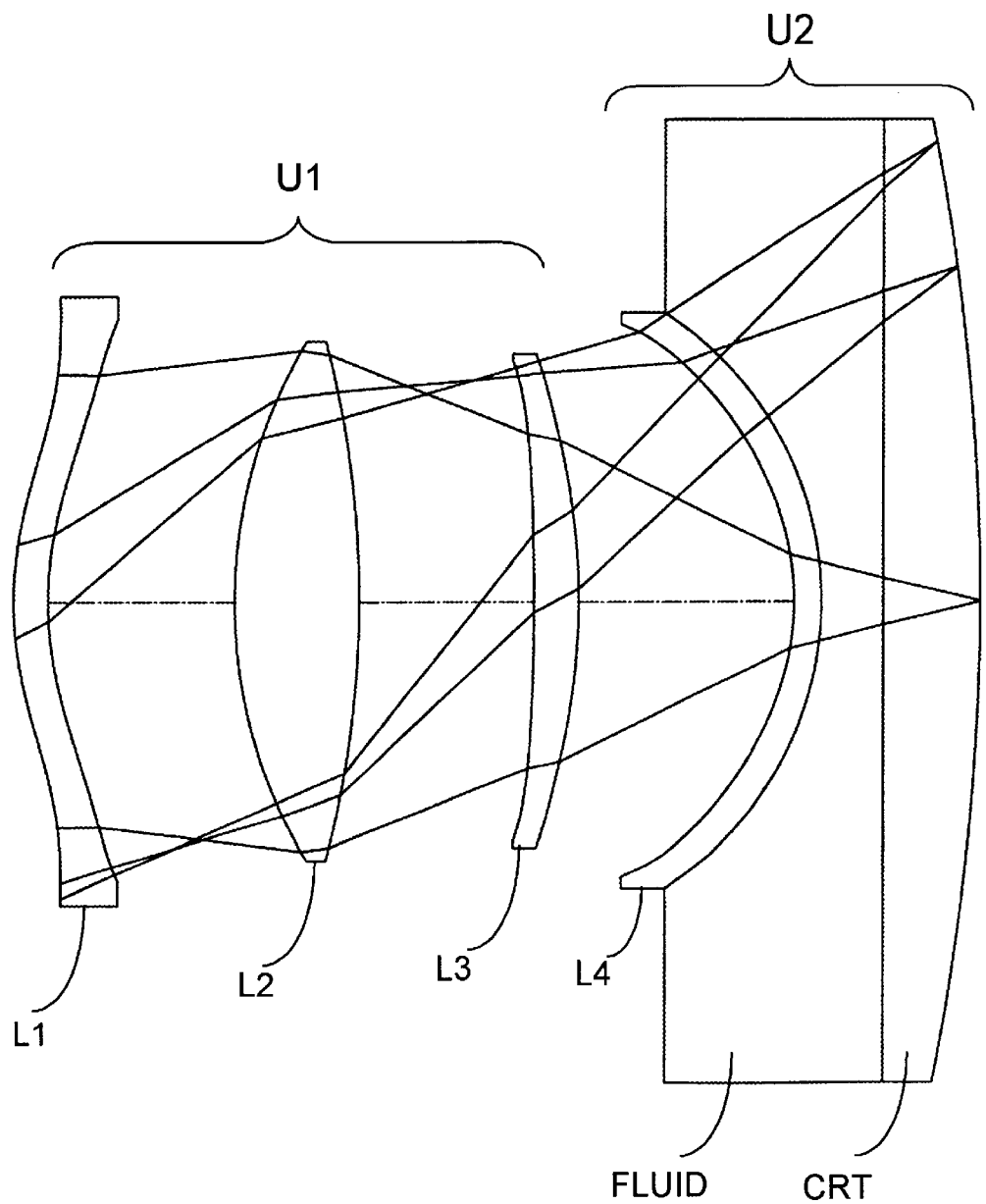
Figure 6:
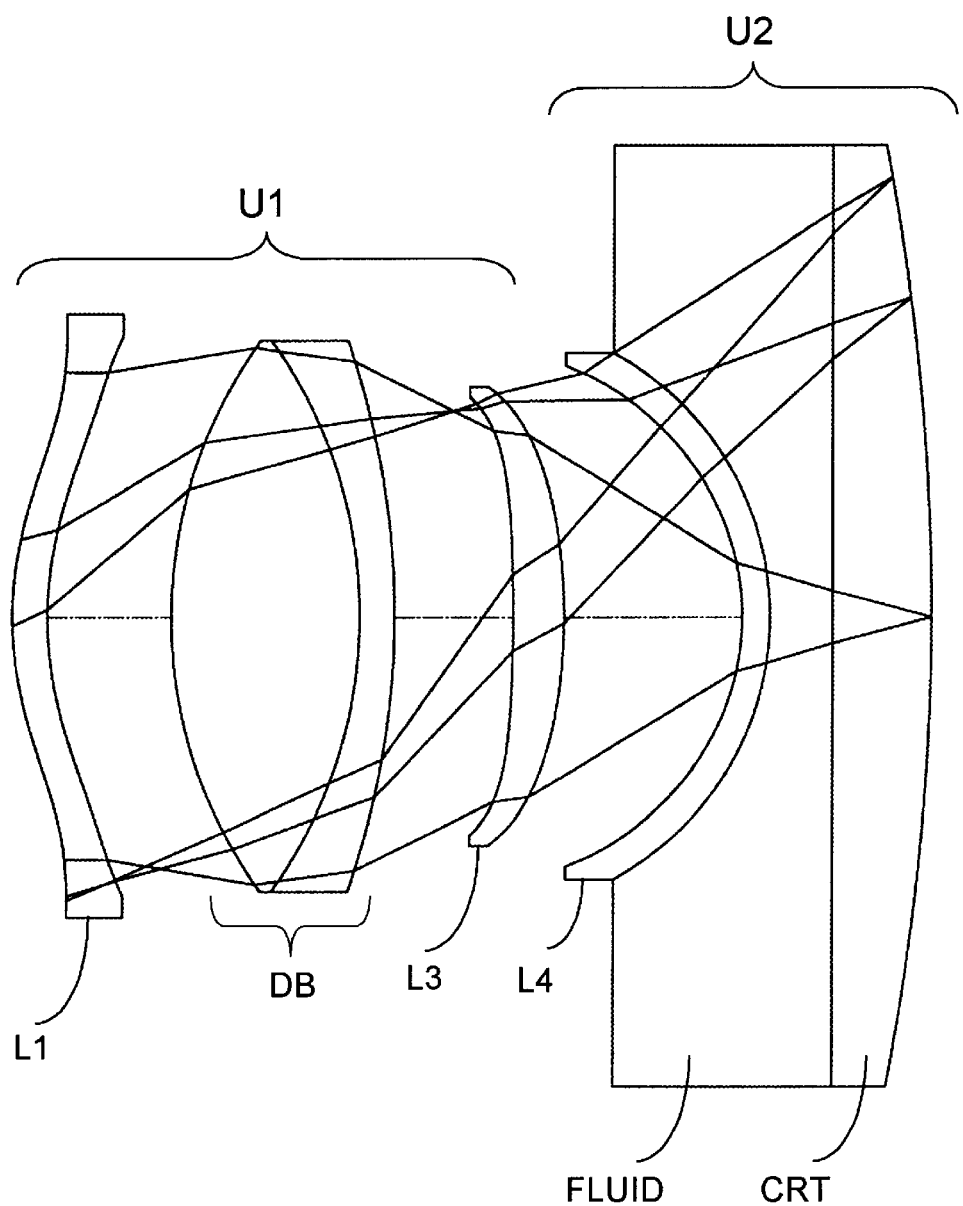
Figure 7:
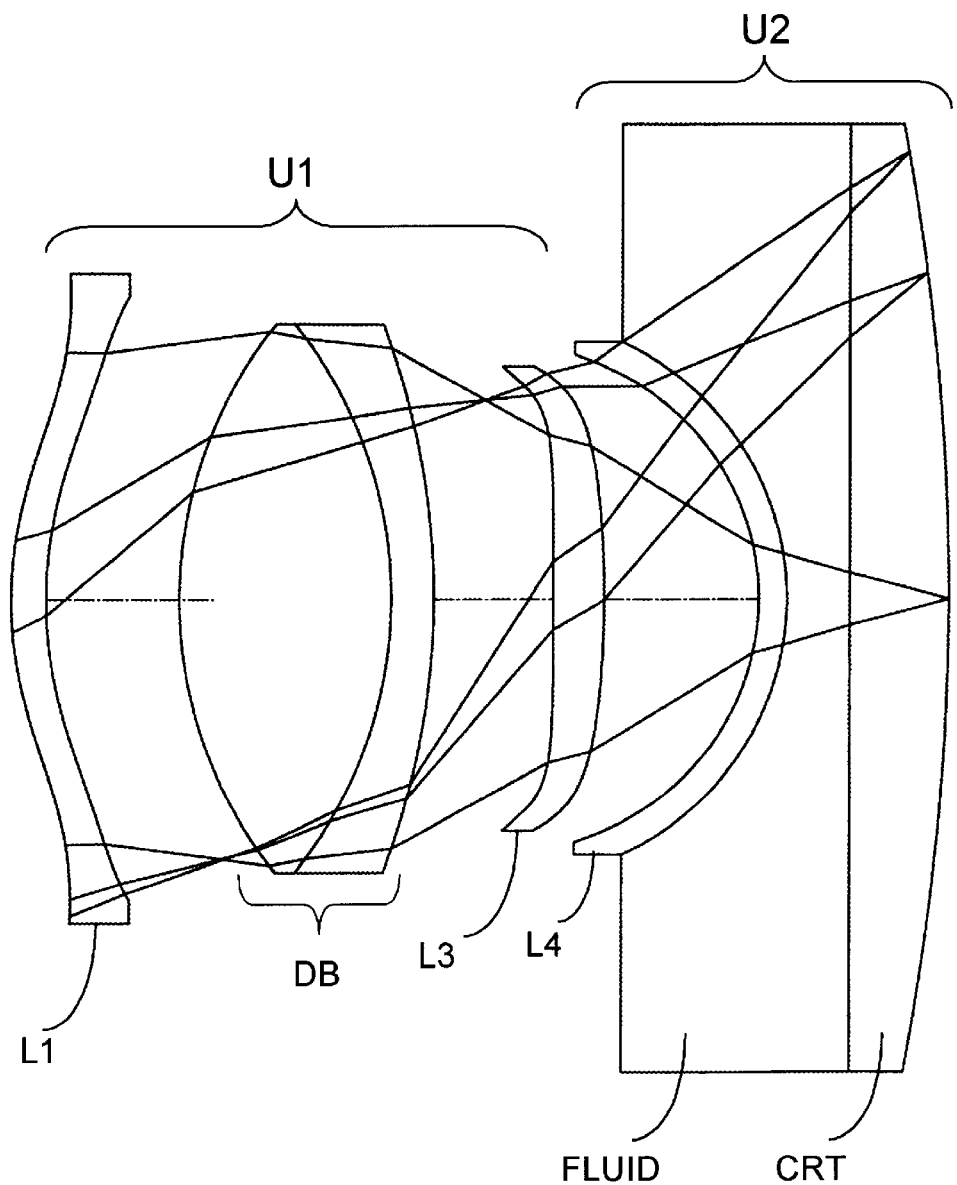
Figure 8A:
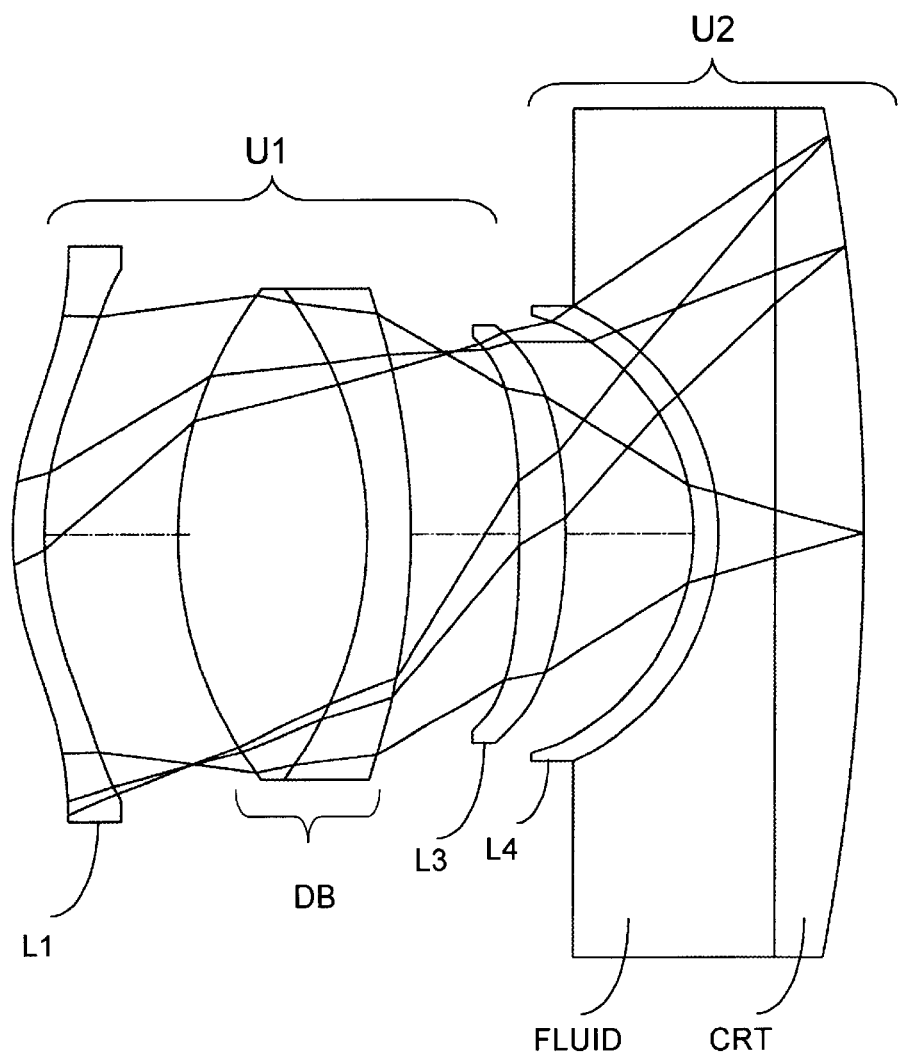
FIG. 8A is a schematic side view of a lens system constructed in accordance with the invention.
Figure 8B:
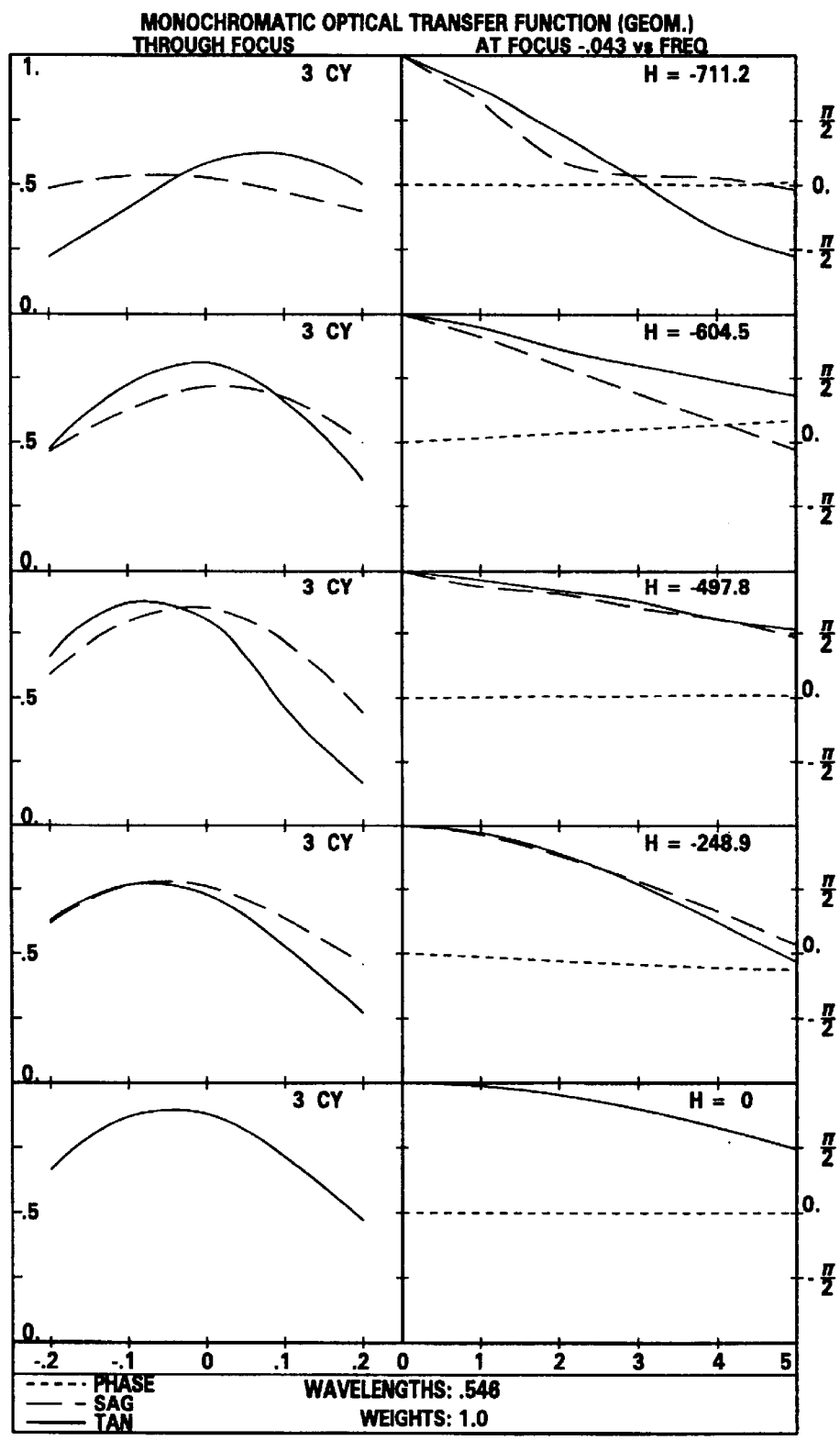
FIG. 8B is a MTF/OTF plot for the prescription of Table 8 when used with green light ($\lambda$=546 nm).
Figure 8C:
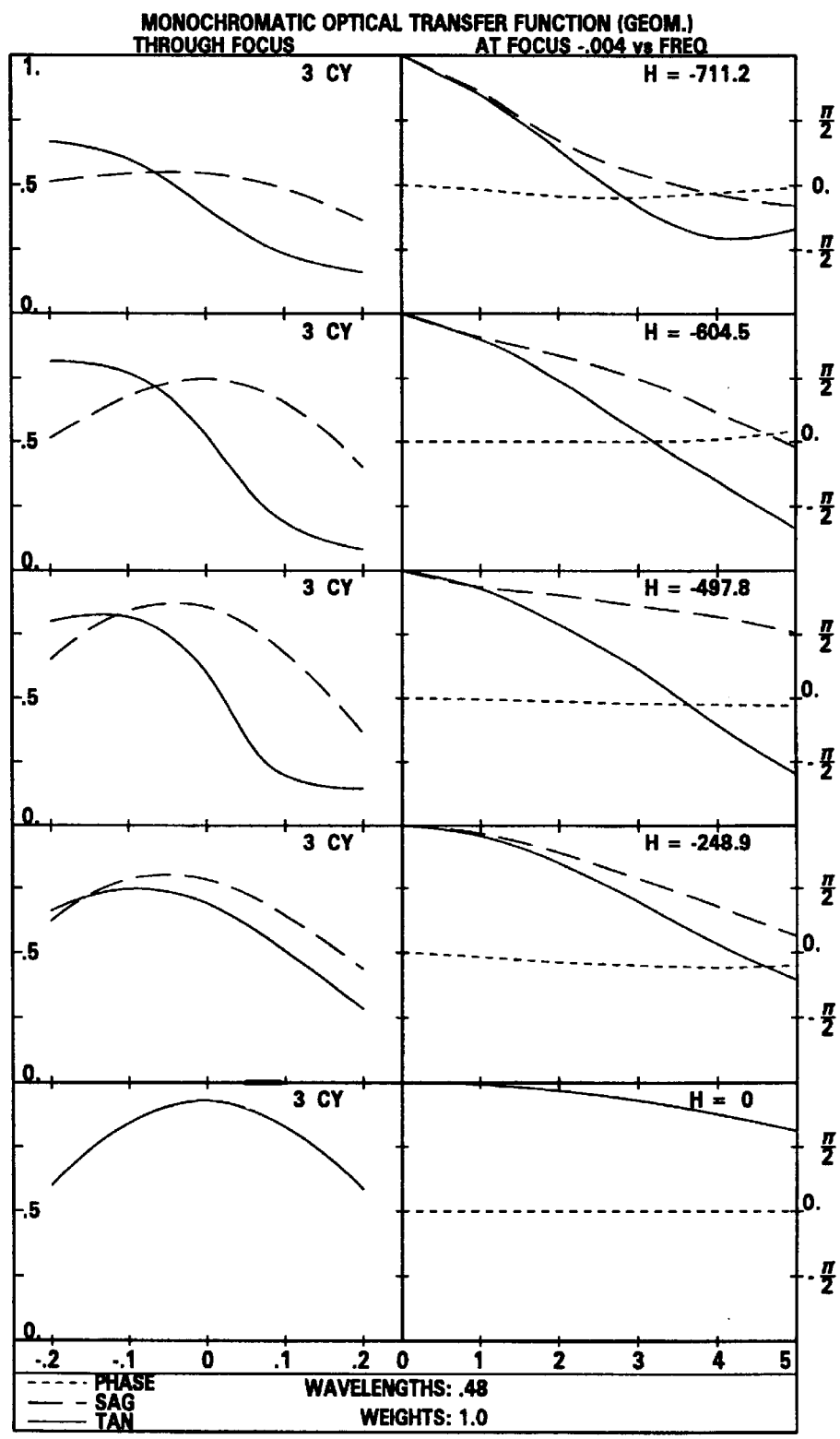
FIG. 8C is a MTF/OTF plot for the prescription of Table 8 when used with blue light ($\lambda$=480 nm).
Figure 8D:
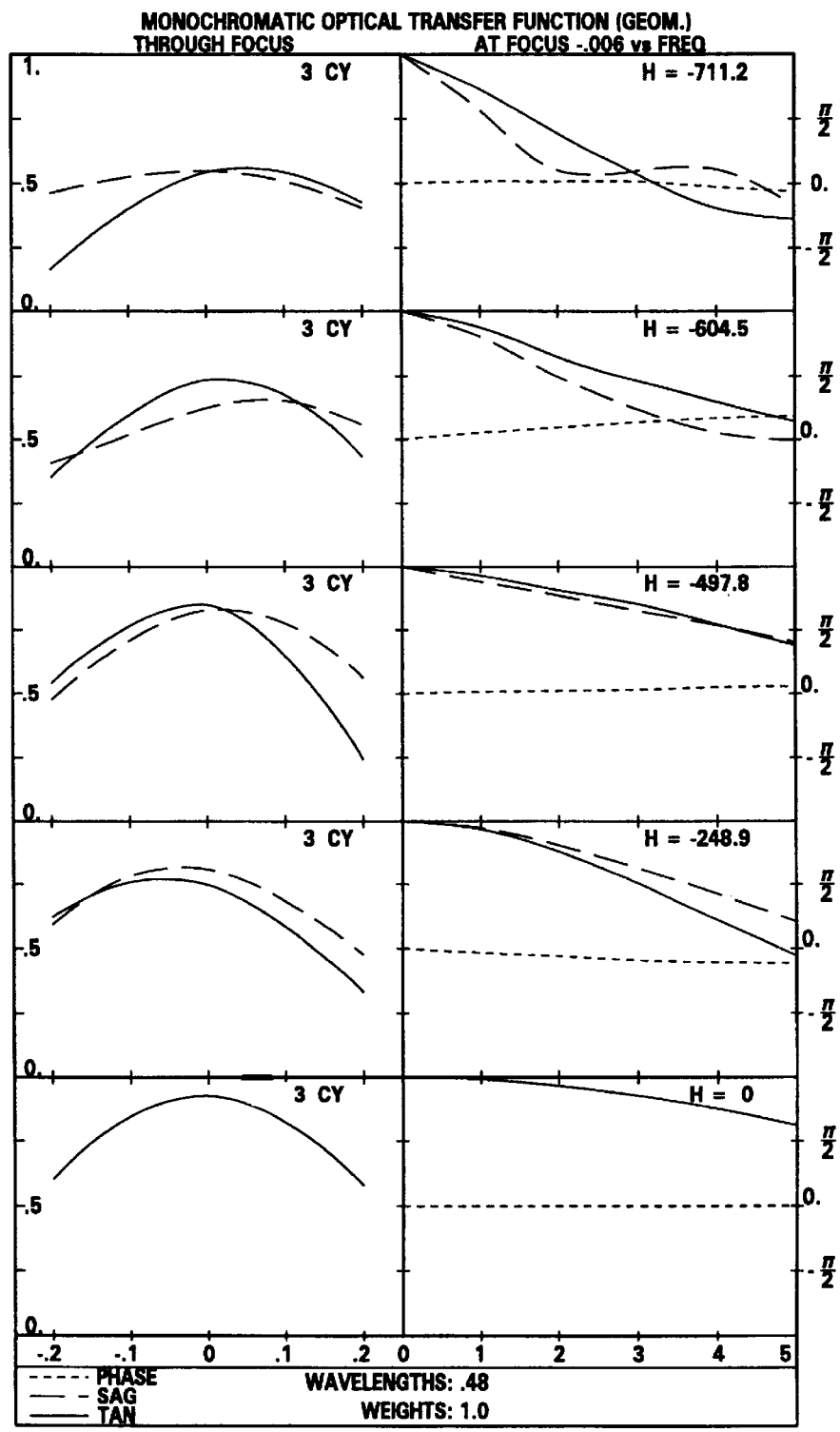
FIG. 8D is a MTF/OTF plot for the prescription of Table 8B when used with blue light ($\lambda$=480 nm).
Figure 8E:
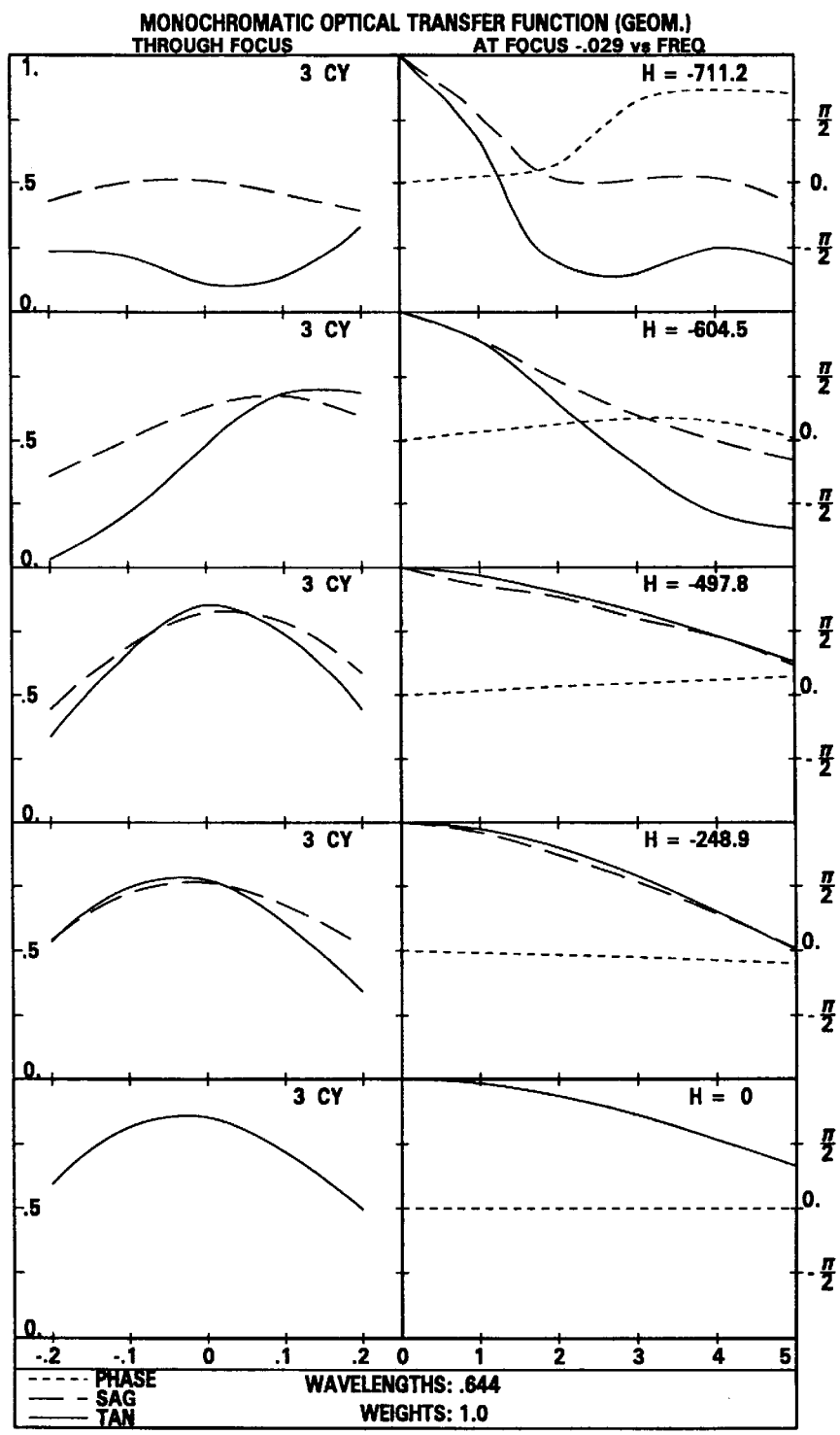
FIG. 8E is a MTF/OTF plot for the prescription of Table 8 when used with red light ($\lambda$=644 nm).
Figure 8F:
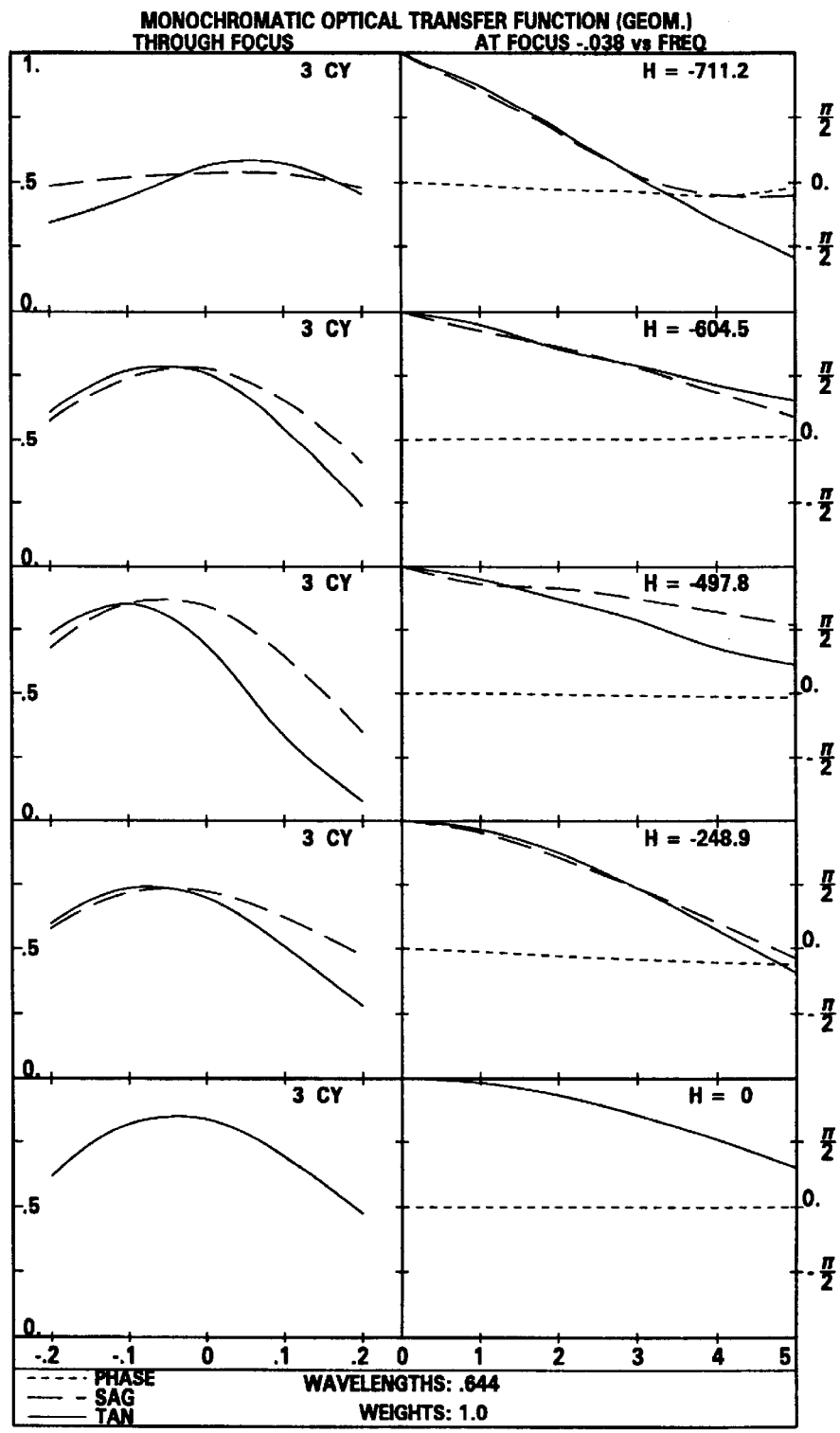
FIG. 8F is a MTF/OTF plot for the prescription of Table 8R when used with red light ($\lambda$=644 nm).

FIGS. 1E and 1F show the corresponding plots for red light, i.e., FIG. 1E shows the behavior of the Table 1 prescription when refocused for red light and FIG. 1F shows the behavior of the Table 1R prescription obtained by refocusing for red light and then re-optimizing for that light subject to the constraint that the first lens unit (U1) is unchanged. Again, the improved performance obtained by customizing the second lens unit based on color is evident.

FIGS. 8B–8F show the corresponding MTF/OTF plots for the prescriptions of Tables 8, 8B, and 8R. As with FIGS. 1B–1F, these figures demonstrate that customization of the second lens unit provides an economical and effective technique for improving the color performance of CRT projection lenses.

Blue and red versions of the prescriptions of Tables 2–7 are obtained in the same manner as for Tables 1 and 8, i.e., by refocusing the green prescription for blue (red) light and then re-optimizing for that light subject to the constraint that the first lens unit (U1) is unchanged.

Tables 9–11 summarize the properties of the lenses of Tables 1, 1B, 1R, 2–8, 8B, and 8R, as well as the properties of the lenses of Tables III and V of U.S. Pat. No. 4,776,681, referred to above. As can be seen from these tables, the lenses of the examples satisfy characteristics (i) to (xiv) discussed above.

Figure 9:
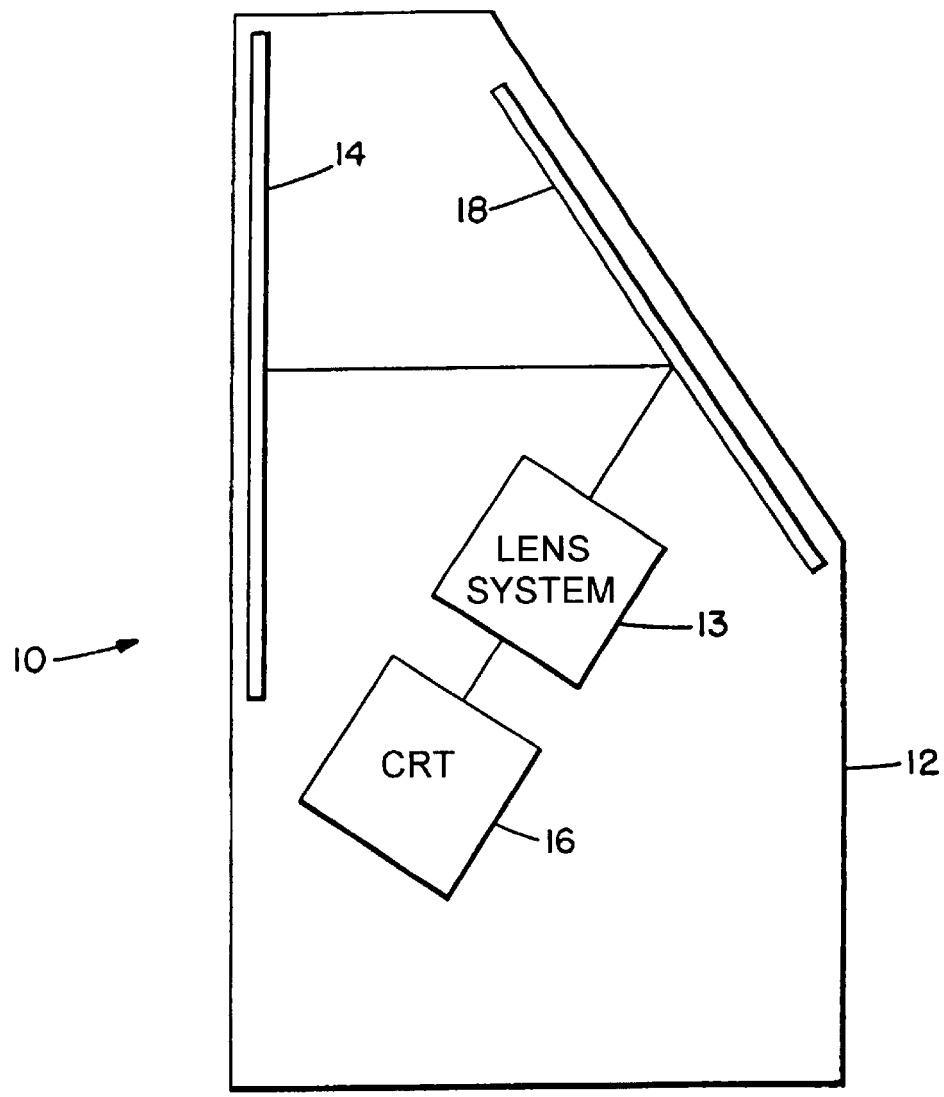
FIG. 9 is a schematic diagram of a projection TV employing a projection lens system constructed in accordance with the invention.

FIG. 9 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a projection lens constructed in accordance with the invention and module 16 illustrates its associated CRT tube. In practice, three projection lenses 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 51.5080 | 5.00000 | ACRYLIC | 86.04 |
| 2 | a | 55.0776 | 16.91225 | | 79.82 |
| 3 | | ∞ | 7.50000 | | 73.25 |
| 4 | | 66.5670 | 21.00000 | BACD5 | 77.56 |
| 5 | | −172.3992 | 11.06055 | | 76.01 |
| 6 | | ∞ | 8.67071 | | 62.86 |

TABLE 1-continued

| | | | | | |
|---|---|---|---|---|---|
| 7 | a | −581.3852 | 7.30000 | ACRYLIC | 64.53 |
| 8 | a | −84.6132 | Space 1 | | 66.45 |
| 9 | a | −37.1570 | 4.00000 | ACRYLIC | 71.12 |
| 10 | | −44.0000 | 9.00000 | 437500 | 76.24 |
| 11 | | ∞ | 14.10000 | 563500 | 130.00 |
| 12 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.6060E−06 | −2.4391E−09 | −1.4654E−12 | 2.3224E−15 | −8.4118E−19 | 8.7791E−23 |
| 2 | −7.4115E−07 | −3.1537E−09 | 1.2078E−13 | 1.1316E−15 | −2.6881E−19 | −2.6357E−23 |
| 7 | −2.3299E−06 | 2.4195E−09 | −5.8100E−12 | 4.4490E−15 | 1.6512E−19 | −1.0406E−21 |
| 8 | −3.7383E−07 | −3.6568E−10 | 1.5762E−12 | −4.6043E−15 | 5.9384E−18 | −2.4980E−21 |
| 9 | −5.0314E−07 | 1.0829E−08 | −2.7057E−11 | 3.6562E−14 | −2.4088E−17 | 6.3437E−21 |

Variable Spaces

| Focus Pos. | Space 1 T(8) | Focal Shift | Image Distance |
|---|---|---|---|
| 1 | 27.165 | −0.273 | −0.005 |
| 2 | 26.784 | −0.133 | −0.003 |

First-Order Data

| Focus Position | 1 | 2 |
|---|---|---|
| f/number | 1.24 | 1.23 |
| Magnification | −0.1123 | −0.1037 |
| Object Height | −609.60 | −660.40 |
| Object Distance | −764.11 | −824.73 |
| Effective Focal Length | 77.114 | 77.449 |
| Image Distance | −.46434E−02 | −.29979E−02 |
| Overall Length | 895.82 | 956.06 |
| Forward Vertex Distance | 131.70 | 131.32 |
| Barrel Length | 131.71 | 131.33 |
| Stop Surface Number | 5 | 5 |
| Distance to Stop | −4.15 | −4.15 |
| Stop Diameter | 75.850 | 75.918 |
| Entrance Pupil Distance | 41.314 | 41.314 |
| Exit Pupil Distance | −58.470 | −58.317 |

First Order Properties of Elements

| Element Number | Surface Numbers | | Power | f' |
|---|---|---|---|---|
| 1 | 1 | 2 | 0.90896E−03 | 1100.2 |
| 2 | 4 | 5 | 0.11913E−01 | 83.942 |
| 3 | 7 | 8 | 0.50106E−02 | 199.58 |
| 4 | 9 | 10 | −0.16674E−02 | −599.74 |
| 5 | 10 | 11 | −0.99409E−02 | −100.59 |
| 6 | 11 | 12 | 0.16086E−02 | 621.67 |

First Order Properties of Units

| Unit Number | Surface Numbers | | Power | f' |
|---|---|---|---|---|
| 1 | 1 | 8 | 0.14711E−01 | 67.974 |
| 2 | 9 | 12 | −0.10002E−01 | −99.978 |

First Order Properties of the Lens

| Focus Position Number | Power | f' |
|---|---|---|
| 1 | 0.12968E−01 | 77.114 |
| 2 | 0.12912E−01 | 77.449 |

TABLE 1B

| Surf. No. | Type | Radius | Thickness | Glass | Clear Aperture Diameter |
|---|---|---|---|---|---|
| 1 | a | 51.5080 | 5.00000 | ACRYLIC | 85.26 |
| 2 | a | 55.0776 | 16.91225 | | 79.14 |
| 3 | | ∞ | 7.50000 | | 72.52 |
| 4 | | 66.5670 | 21.00000 | BACD5 | 77.04 |
| 5 | | −172.3992 | 11.06055 | | 75.40 |
| 6 | | ∞ | 8.67071 | | 62.85 |
| 7 | a | −581.3852 | 7.30000 | ACRYLIC | 64.75 |
| 8 | a | −84.6132 | Space 1 | | 66.64 |
| 9 | a | −37.1100 | 4.00000 | ACRYLIC | 70.92 |
| 10 | | −44.0000 | 9.00000 | 442101 | 76.05 |
| 11 | | ∞ | 14.10000 | 569101 | 130.00 |
| 12 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.6060E−06 | −2.4391E−09 | −1.4654E−12 | 2.3224E−15 | −8.4118E−19 | 8.7791E−23 |
| 2 | −7.4115E−07 | −3.1537E−09 | 1.2078E−13 | 1.1316E−15 | −2.6881E−19 | −2.6357E−23 |
| 7 | −2.3299E−06 | 2.4195E−09 | −5.8100E−12 | 4.4490E−15 | 1.6512E−19 | −1.0406E−21 |
| 8 | −3.7383E−07 | −3.6568E−10 | 1.5762E−12 | −4.6043E−15 | 5.9384E−18 | −2.4980E−21 |
| 9 | −4.4366E−07 | 1.0848E−08 | −2.7056E−11 | 3.6550E−14 | −2.4099E−17 | 6.3324E−21 |

Variable Spaces

| Focus Pos. | Space 1 T(8) | Focal Shift | Image Distance |
|---|---|---|---|
| 1 | 26.614 | −0.411 | 0.000 |
| 2 | 26.255 | −0.248 | 0.000 |

First-Order Data

| Focus Position | 1 | 2 |
|---|---|---|
| f/number | 1.24 | 1.23 |
| Magnification | 0.1123 | −0.1037 |
| Object Height | −609.60 | −660.40 |
| Object Distance | −760.42 | −820.61 |
| Effective Focal Length | 76.755 | 77.074 |
| Image Distance | 0.12332E−03 | 0.37637E−03 |
| Overall Length | 891.58 | 951.41 |
| Forward Vertex Distance | 131.16 | 130.80 |
| Barrel Length | 131.16 | 130.80 |
| Stop Surface Number | 5 | 5 |
| Distance to Stop | −4.61 | −4.61 |
| Stop Diameter | 75.769 | 75.818 |
| Entrance Pupil Distance | 40.686 | 40.686 |
| Exit Pupil Distance | −58.296 | −58.152 |

First Order Properties of Elements

| Element Number | Surface Numbers | | Power | f' |
|---|---|---|---|---|
| 1 | 1 | 2 | 0.91899E−03 | 1088.2 |
| 2 | 4 | 5 | 0.12010E−01 | 83.263 |
| 3 | 7 | 8 | 0.50563E−02 | 197.77 |
| 4 | 9 | 10 | −0.16966E−02 | −589.42 |
| 5 | 10 | 11 | −0.10043E−01 | −99.569 |
| 6 | 11 | 12 | 0.16251E−02 | 615.33 |

First Order Properties of Units

| Unit Number | Surface Numbers | | Power | f' |
|---|---|---|---|---|
| 1 | 1 | 8 | 0.14814E−01 | 67.502 |
| 2 | 9 | 12 | −0.10117E−01 | −98.844 |

First Order Properties of the Lens

| Focus Position Number | Power | f' |
|---|---|---|

TABLE 1B-continued

| | | |
|---|---|---|
| 1 | 0.13028E−01 | 76.755 |
| 2 | 0.12975E−01 | 77.074 |

TABLE 1R

| Surf. No. | Type | Radius | Thickness | Glass | Clear Aperture Diameter |
|---|---|---|---|---|---|
| 1 | a | 51.5080 | 5.00000 | ACRYLIC | 85.95 |
| 2 | a | 55.0776 | 16.91225 | | 79.75 |
| 3 | | ∞ | 7.50000 | | 73.28 |
| 4 | | 66.5670 | 21.00000 | BACD5 | 78.02 |
| 5 | | −172.3992 | 11.06055 | | 76.55 |
| 6 | | ∞ | 8.67071 | | 63.37 |
| 7 | a | −581.3852 | 7.30000 | ACRYLIC | 64.76 |
| 8 | a | −84.6132 | Space 1 | | 66.68 |
| 9 | a | −37.2527 | 4.00000 | ACRYLIC | 71.43 |
| 10 | | −44.0000 | 9.00000 | 433155 | 76.56 |
| 11 | | ∞ | 14.10000 | 558155 | 130.00 |
| 12 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.6060E−06 | −2.4391E−09 | −1.4654E−12 | 2.3224E−15 | −8.4118E−19 | 8.7791E−23 |
| 2 | −7.4115E−07 | −3.1537E−09 | 1.2078E−13 | 1.1316E−15 | −2.6881E−19 | −2.6357E−23 |
| 7 | −2.3299E−06 | 2.4195E−09 | −5.8100E−12 | 4.4490E−15 | 1.6512E−19 | −1.0406E−21 |
| 8 | −3.7383E−07 | −3.6568E−10 | 1.5762E−12 | −4.6043E−15 | 5.9384E−18 | −2.4980E−21 |
| 9 | −6.8201E−07 | 1.0829E−08 | −2.7016E−11 | 3.6582E−14 | −2.4083E−17 | 6.3287E−21 |

Variable Spaces

| Focus Pos. | Space 1 T(8) | Focal Shift | Image Distance |
|---|---|---|---|
| 1 | 27.737 | −0.082 | 0.000 |
| 2 | 27.316 | 0.006 | 0.000 |

First-Order Data

| Focus Position | 1 | 2 |
|---|---|---|
| f/number | 1.24 | 1.23 |
| Magnification | −0.1123 | −0.1037 |
| Object Height | −609.60 | −660.40 |
| Object Distance | −767.24 | −828.41 |
| Effective Focal Length | 77.424 | 77.791 |
| Image Distance | −.22718E−03 | −.23490E−03 |
| Overall Length | 899.52 | 960.27 |
| Forward Vertex Distance | 132.28 | 131.86 |
| Barrel Length | 132.28 | 131.86 |
| Stop Surface Number | 5 | 5 |
| Distance to Stop | −4.27 | −4.27 |
| Stop Diameter | 76.413 | 76.527 |
| Entrance Pupil Distance | 41.173 | 41.173 |
| Exit Pupil Distance | −58.999 | −58.829 |

First Order Properties of Elements

| Element Number | Surface Numbers | | Power | f' |
|---|---|---|---|---|
| 1 | 1 | 2 | 0.89964E−03 | 1111.6 |
| 2 | 4 | 5 | 0.11819E−01 | 84.609 |
| 3 | 7 | 8 | 0.49681E−02 | 201.29 |
| 4 | 9 | 10 | −0.16227E−02 | −616.26 |
| 5 | 10 | 11 | −0.98444E−02 | −101.58 |
| 6 | 11 | 12 | 0.15930E−02 | 627.76 |

First Order Properties of Units

| Unit | Surface |
|---|---|

TABLE 1R-continued

| Number | Numbers | | Power | f' |
|---|---|---|---|---|
| 1 | 1 | 8 | 0.14613E−01 | 68.434 |
| 2 | 9 | 12 | −0.98768E−02 | −101.25 |

First Order Properties of the Lens

| Focus Position Number | Power | f' |
|---|---|---|
| 1 | 0.12916E−01 | 77.424 |
| 2 | 0.12855E−01 | 77.791 |

TABLE 2

| Surf. No. | Type | Radius | Thickness | Glass | Clear Aperture Diameter |
|---|---|---|---|---|---|
| 1 | a | 53.7740 | 5.00000 | ACRYLIC | 93.60 |
| 2 | a | 56.1830 | 27.79806 | | 85.02 |
| 3 | | ∞ | −1.00000 | | 75.64 |
| 4 | | 66.5924 | 21.00000 | BACD5 | 78.26 |
| 5 | | −171.5276 | 13.30545 | | 76.90 |
| 6 | | ∞ | 4.17071 | | 60.30 |
| 7 | a | −400.0000 | 6.00000 | ACRYLIC | 61.19 |
| 8 | a | −87.9944 | Space 1 | | 62.37 |
| 9 | a | −43.0597 | 4.00000 | ACRYLIC | 71.09 |
| 10 | | −45.0000 | 9.00000 | 437500 | 76.07 |
| 11 | | ∞ | 14.10000 | 563500 | 130.00 |
| 12 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.2265E−06 | −2.3882E−09 | −6.4006E−13 | 1.4984E−15 | −5.8274E−19 | 6.8878E−23 |
| 2 | −3.6048E−07 | −2.7724E−09 | 1.5192E−13 | 1.1811E−15 | −5.1374E−19 | 7.0884E−23 |
| 7 | −7.3999E−07 | −4.0344E−10 | 2.7663E−12 | −3.5022E−15 | 4.4633E−18 | −2.1176E−21 |
| 8 | 7.2290E−07 | −6.1251E−11 | −1.3445E−14 | 3.3606E−15 | −1.8271E−18 | 3.2661E−23 |
| 9 | −4.7004E−06 | 1.7256E−08 | −3.4844E−11 | 3.7322E−14 | −1.9800E−17 | 3.8942E−21 |

Variable Spaces

| Focus Pos. | Space 1 T(8) | Focal Shift | Image Distance |
|---|---|---|---|
| 1 | 30.819 | −0.068 | 0.000 |
| 2 | 31.589 | −0.292 | 0.000 |

First-Order Data

| Focus Position | 1 | 2 |
|---|---|---|
| f/number | 1.23 | 1.25 |
| Magnification | −0.1037 | −0.1198 |
| Object Height | −660.40 | −571.50 |
| Object Distance | −818.20 | −712.57 |
| Effective Focal Length | 77.536 | 76.987 |
| Image Distance | −.40704E−03 | 0.00 |
| Overall Length | 952.40 | 847.53 |
| Forward Vertex Distance | 134.19 | 134.96 |
| Barrel Length | 134.19 | 134.96 |
| Stop Surface Number | 5 | 5 |
| Distance to Stop | 0.21 | 0.21 |
| Stop Diameter | 72.324 | 72.601 |
| Entrance Pupil Distance | 49.502 | 49.502 |
| Exit Pupil Distance | −58.216 | −58.597 |

First Order Properties of Elements

| Element Number | Surface Numbers | | Power | f' |
|---|---|---|---|---|
| 1 | 1 | 2 | 0.66386E−03 | 1506.3 |

TABLE 2-continued

| | | | | |
|---|---|---|---|---|
| 2 | 4 | 5 | 0.11925E−01 | 83.857 |
| 3 | 7 | 8 | 0.44048E−02 | 227.02 |
| 4 | 9 | 10 | −0.15751E−03 | −6348.7 |
| 5 | 10 | 11 | −0.97200E−02 | −102.88 |
| 6 | 11 | 12 | 0.16086E−02 | 621.67 |

First Order Properties of Units

| Unit Number | Surface Numbers | | Power | f' |
|---|---|---|---|---|
| 1 | 1 | 8 | 0.14449E−01 | 69.208 |
| 2 | 9 | 12 | −0.82679E−02 | −120.95 |

First Order Properties of the Lens

| Focus Position Number | Power | f' |
|---|---|---|
| 1 | 0.12897E−01 | 77.536 |
| 2 | 0.12989E−01 | 76.987 |

TABLE 3

| Surf. No. | Type | Radius | Thickness | Glass | Clear Aperture Diameter |
|---|---|---|---|---|---|
| 1 | a | 50.3339 | 5.00000 | ACRYLIC | 87.68 |
| 2 | a | 53.0103 | 24.84693 | | 79.67 |
| 3 | | ∞ | 2.00000 | | 69.00 |
| 4 | | 59.6426 | 19.00000 | BACD5 | 72.83 |
| 5 | | −192.5244 | 11.61157 | | 71.56 |
| 6 | | ∞ | 8.00000 | | 57.60 |
| 7 | a | 481.8461 | 7.00000 | ACRYLIC | 61.04 |
| 8 | a | −104.5012 | Space 1 | | 63.13 |
| 9 | a | −34.6426 | 4.00000 | ACRYLIC | 67.01 |
| 10 | | −40.0000 | 8.00000 | 426500 | 71.90 |
| 11 | | ∞ | 14.10000 | 560500 | 130.00 |
| 12 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.1919E−06 | −2.0822E−09 | −1.6166E−12 | 2.3016E−15 | −8.4967E−19 | 9.2699E−23 |
| 2 | 1.2041E−08 | −3.0791E−09 | 2.2114E−13 | 1.0685E−15 | −2.9072E−19 | −1.0694E−23 |
| 7 | −1.2221E−06 | 6.4250E−10 | −4.6001E−12 | 5.7333E−15 | −3.6797E−18 | −1.6723E−22 |
| 8 | 1.1519E−06 | −3.1235E−09 | 5.3427E−12 | −6.8128E−15 | 5.1321E−18 | −2.5124E−21 |
| 9 | −1.2127E−06 | 1.4555E−08 | −3.3800E−11 | 4.3653E−14 | −2.7959E−17 | 7.4638E−21 |

Variable Spaces

| Focus Pos. | Space 1 T(8) | Focal Shift | Image Distance |
|---|---|---|---|
| 1 | 25.247 | −0.110 | 0.001 |
| 2 | 24.977 | −0.028 | 0.003 |

First-Order Data

| Focus Position | 1 | 2 |
|---|---|---|
| f/number | 1.25 | 1.24 |
| Magnification | −0.1317 | −0.1254 |
| Object Height | −520.00 | −546.10 |
| Object Distance | −609.10 | −638.48 |
| Effective Focal Length | 71.446 | 71.675 |
| Image Distance | 0.14560E−02 | 0.25459E−02 |
| Overall Length | 737.91 | 767.02 |
| Forward Vertex Distance | 128.81 | 128.54 |
| Barrel Length | 128.81 | 128.54 |
| Stop Surface Number | 4 | 4 |
| Distance to Stop | 17.20 | 17.20 |
| Stop Diameter | 70.943 | 70.949 |

TABLE 3-continued

|  |  |  |
|---|---|---|
| Entrance Pupil Distance | 46.490 | 46.490 |
| Exit Pupil Distance | −54.444 | −54.330 |

First Order Properties of Elements

| Element Number | Surface Numbers |  | Power | f |
|---|---|---|---|---|
| 1 | 1 | 2 | 0.80116E−03 | 1248.2 |
| 2 | 4 | 5 | 0.12624E−01 | 79.212 |
| 3 | 7 | 8 | 0.57271E−02 | 174.61 |
| 4 | 9 | 10 | −0.14379E−02 | −695.47 |
| 5 | 10 | 11 | −0.10650E−01 | −93.897 |
| 6 | 11 | 12 | 0.16000E−02 | 625.00 |

First Order Properties of Units

| Unit Number | Surface Numbers |  | Power | f |
|---|---|---|---|---|
| 1 | 1 | 8 | 0.15721E−01 | 63.609 |
| 2 | 9 | 12 | −0.10540E−01 | −94.873 |

First Order Properties of the Lens

| Focus Position Number | Power | f' |
|---|---|---|
| 1 | 0.13997E−01 | 71.446 |
| 2 | 0.13952E−01 | 71.675 |

TABLE 4

| Surf. No. | Type | Radius | Thickness | Glass | Clear Aperture Diameter |
|---|---|---|---|---|---|
| 1 | a | 48.2818 | 5.00000 | ACRYLIC | 84.50 |
| 2 | a | 50.6927 | 17.81595 |  | 75.64 |
| 3 |  | ∞ | 7.50000 |  | 71.02 |
| 4 |  | 54.1530 | 19.00000 | BACD5 | 68.05 |
| 5 |  | −184.8429 | 9.65566 |  | 66.40 |
| 6 |  | ∞ | 6.20000 |  | 55.41 |
| 7 | a | −1368.4931 | 8.00000 | ACRYLIC | 55.73 |
| 8 | a | −74.3722 | Space 1 |  | 58.34 |
| 9 | a | −32.2393 | 4.00000 | ACRYLIC | 62.60 |
| 10 |  | −38.0000 | 8.00000 | 426500 | 68.57 |
| 11 |  | ∞ | 14.10000 | 560500 | 111.70 |
| 12 |  | −350.0000 | Image distance |  | 124.15 |

Symbol Description
a - Polynomial asphere

Even Polynomial Aspheres

| Surf. No. | D | E | F | G | H | I |
|---|---|---|---|---|---|---|
| 1 | −1.6519E−06 | −2.2063E−09 | −1.5806E−12 | 2.3455E−15 | −8.3472E−19 | 7.4111E−23 |
| 2 | −2.8153E−07 | −3.0635E−09 | 3.0620E−13 | 1.0863E−15 | −2.7800E−19 | 1.3038E−23 |
| 7 | −3.7496E−06 | 5.0056E−10 | −6.1860E−12 | 3.8274E−15 | −2.3407E−18 | 2.4054E−21 |
| 8 | −5.1890E−07 | −3.7034E−09 | 3.8532E−12 | −6.4432E−15 | 5.6659E−18 | −1.2687E−21 |
| 9 | −1.8070E−06 | 1.3298E−08 | −2.7646E−11 | 3.8134E−14 | −2.7761E−17 | 9.0371E−21 |

Variable Spaces

| Focus Pos. | Space 1 T(8) | Focal Shift | Image Distance |
|---|---|---|---|
| 1 | 23.315 | 0.185 | 0.000 |
| 2 | 22.965 | 0.325 | −0.001 |

First-Order Data

| Focus Position | 1 | 2 |
|---|---|---|
| f/number | 1.25 | 1.24 |
| Magnification | −0.1348 | −0.1254 |
| Object Height | −508.00 | −546.10 |

TABLE 4-continued

| | | |
|---|---|---|
| Object Distance | −555.75 | −595.56 |
| Effective Focal Length | 66.686 | 66.990 |
| Image Distance | −.48092E−03 | −.57864E−03 |
| Overall Length | 678.34 | 717.80 |
| Forward Vertex Distance | 122.59 | 122.24 |
| Barrel Length | 122.59 | 122.24 |
| Stop Surface Number | 4 | 4 |
| Distance to Stop | 16.50 | 16.50 |
| Stop Diameter | 66.190 | 65.907 |
| Entrance Pupil Distance | 44.427 | 44.427 |
| Exit Pupil Distance | −51.363 | −51.216 |

First Order Properties of Elements

| Element Number | Surface Numbers | | Power | f |
|---|---|---|---|---|
| 1 | 1 | 2 | 0.81983E−03 | 1219.8 |
| 2 | 4 | 5 | 0.13704E−01 | 72.973 |
| 3 | 7 | 8 | 0.62913E−02 | 158.95 |
| 4 | 9 | 10 | −0.17889E−02 | −559.00 |
| 5 | 10 | 11 | −0.11211E−01 | −89.202 |
| 6 | 11 | 12 | 0.16000E−02 | 625.00 |

First Order Properties of Units

| Unit Number | Surface Numbers | | Power | f |
|---|---|---|---|---|
| 1 | 1 | 8 | 0.16988E−01 | 58.864 |
| 2 | 9 | 12 | −0.11478E−01 | −87.122 |

First Order Properties of the Lens

| Focus Position Number | Power | f' |
|---|---|---|
| 1 | 0.14996E−01 | 66.686 |
| 2 | 0.14928E−01 | 66.990 |

TABLE 5

| Surf. No. | Type | Radius | Thickness | Glass | Clear Aperture Diameter |
|---|---|---|---|---|---|
| 1 | a | 51.8175 | 5.00000 | ACRYLIC | 86.41 |
| 2 | a | 51.3029 | 23.04390 | | 79.75 |
| 3 | | ∞ | 4.00000 | | 69.96 |
| 4 | | 73.8000 | 18.00000 | BACD5 | 73.52 |
| 5 | | −149.6273 | 12.00000 | | 72.54 |
| 6 | | ∞ | 13.27802 | | 63.86 |
| 7 | a | −595.3640 | 6.50000 | ACRYLIC | 67.83 |
| 8 | a | −98.1725 | Space 1 | | 69.85 |
| 9 | a | −41.0654 | 4.00000 | ACRYLIC | 78.42 |
| 10 | | −50.0000 | 9.00000 | 435500 | 83.72 |
| 11 | | ∞ | 14.10000 | 562500 | 135.00 |
| 12 | | −350.0000 | Image distance | | 135.00 |

Symbol Description
a - Polynomial asphere

Even Polynomial Aspheres

| Surf. No. | D | E | F | G | H | I |
|---|---|---|---|---|---|---|
| 1 | −2.5164E−06 | −3.1781E−09 | 6.8174E−13 | 9.0785E−16 | −4.9563E−19 | 6.5479E−23 |
| 2 | −2.0075E−06 | −3.2893E−09 | 1.1892E−12 | 6.6158E−16 | −3.8870E−19 | 3.7080E−23 |
| 7 | −9.7221E−07 | −6.3343E−10 | 1.9162E−12 | −2.8194E−15 | 1.9415E−18 | −5.9326E−22 |
| 8 | 1.2956E−07 | 9.0572E−10 | −2.6712E−12 | 4.3006E−15 | −2.8414E−18 | 6.1162E−22 |
| 9 | −1.8419E−06 | 1.3281E−08 | −2.4200E−11 | 2.4210E−14 | −1.2250E−17 | 2.5283E−21 |

Variable Spaces

| Focus Pos. | Space 1 T(8) | Focal Shift | Image Distance |
|---|---|---|---|
| 1 | 31.252 | 0.223 | 0.000 |

TABLE 5-continued

| | | | |
|---|---|---|---|
| 2 | 32.345 | −0.016 | 0.000 |

First-Order Data

| Focus Position | 1 | 2 |
|---|---|---|
| f/number | 1.39 | 1.40 |
| Magnification | −0.1056 | −0.1263 |
| Object Height | −698.50 | −584.20 |
| Object Distance | −860.41 | −725.13 |
| Effective Focal Length | 82.274 | 81.389 |
| Image Distance | 0.00 | 0.00 |
| Overall Length | 1000.6 | 866.40 |
| Forward Vertex Distance | 140.17 | 141.27 |
| Barrel Length | 140.17 | 141.27 |
| Stop Surface Number | 5 | 5 |
| Distance to Stop | 0.78 | 0.78 |
| Stop Diameter | 67.551 | 68.348 |
| Entrance Pupil Distance | 46.989 | 46.989 |
| Exit Pupil Distance | −61.675 | −62.133 |

First Order Properties of Elements

| Element Number | Surface Numbers | | Power | f' |
|---|---|---|---|---|
| 1 | 1 | 2 | 0.21140E−03 | 4730.3 |
| 2 | 4 | 5 | 0.11608E−01 | 86.146 |
| 3 | 7 | 8 | 0.42185E−02 | 237.05 |
| 4 | 9 | 10 | −0.18306E−02 | −546.26 |
| 5 | 10 | 11 | −0.87000E−02 | −114.94 |
| 6 | 11 | 12 | 0.16057E−02 | 622.78 |

First Order Properties of Units

| Unit Number | Surface Numbers | | Power | f' |
|---|---|---|---|---|
| 1 | 1 | 8 | 0.13594E−01 | 73.565 |
| 2 | 9 | 12 | −0.88878E−02 | −112.51 |

First Order Properties of the Lens

| Focus Position Number | Power | f' |
|---|---|---|
| 1 | 0.12155E−01 | 82.274 |
| 2 | 0.12287E−01 | 81.389 |

TABLE 6

| Surf. No. | Type | Radius | Thickness | Glass | Clear Aperture Diameter |
|---|---|---|---|---|---|
| 1 | a | 50.8103 | 5.00000 | ACRYLIC | 84.42 |
| 2 | a | 52.5368 | 10.16775 | | 78.19 |
| 3 | | ∞ | 7.50000 | | 78.32 |
| 4 | | 67.7300 | 27.00000 | BACD5 | 77.05 |
| 5 | | −67.7300 | 5.00000 | F2 | 76.04 |
| 6 | | −119.2142 | 8.30147 | | 73.09 |
| 7 | | ∞ | 8.67071 | | 60.10 |
| 8 | a | −318.9673 | 7.30000 | ACRYLIC | 61.10 |
| 9 | a | −83.1955 | Space 1 | | 63.93 |
| 10 | a | −36.9497 | 4.00000 | ACRYLIC | 69.82 |
| 11 | | −43.0000 | 9.00000 | 437500 | 75.50 |
| 12 | | ∞ | 14.10000 | 563500 | 130.00 |
| 13 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.6427E−06 | −2.4320E−09 | −1.5053E−12 | 2.3008E−15 | −8.4731E−19 | 9.1176E−23 |

TABLE 6-continued

| | | | | | | |
|---|---|---|---|---|---|---|
| 2 | −7.1469E−07 | −3.1506E−09 | 7.9027E−14 | 1.1139E−15 | −2.6303E−19 | −2.8511E−23 |
| 8 | −2.3508E−06 | 1.4105E−09 | −6.3228E−12 | 4.1530E−15 | −2.0700E−19 | −1.4310E−21 |
| 9 | −7.8771E−07 | −1.4709E−09 | 1.1503E−12 | −4.8930E−15 | 5.6562E−18 | −2.6873E−21 |
| 10 | −2.1861E−06 | 1.1653E−08 | −2.6999E−11 | 3.6009E−14 | −2.4483E−17 | 6.8304E−21 |

Variable Spaces

| Focus Pos. | Space 1 T(9) | Focal Shift | Image Distance |
|---|---|---|---|
| 1 | 25.453 | −0.353 | 0.000 |
| 2 | 25.069 | −0.222 | 0.000 |

First-Order Data

| Focus Position | 1 | 2 |
|---|---|---|
| f/number | 1.24 | 1.23 |
| Magnification | −0.1123 | −0.1037 |
| Object Height | −609.60 | −660.40 |
| Object Distance | −764.72 | −825.16 |
| Effective Focal Length | 76.832 | 77.170 |
| Image Distance | −.16624E−03 | 0.00 |
| Overall Length | 896.21 | 956.27 |
| Forward Vertex Distance | 131.49 | 131.11 |
| Barrel Length | 131.49 | 131.11 |
| Stop Surface Number | 6 | 6 |
| Distance to Stop | −6.13 | −6.13 |
| Stop Diameter | 73.419 | 73.480 |
| Entrance Pupil Distance | 40.319 | 40.319 |
| Exit Pupil Distance | −57.116 | −56.956 |

First Order Properties of Elements

| Element Number | Surface Numbers | | Power | f |
|---|---|---|---|---|
| 1 | 1 | 2 | 0.62509E−03 | 1599.8 |
| 2 | 4 | 5 | 0.16170E−01 | 61.841 |
| 3 | 5 | 6 | −0.38308E−02 | −261.04 |
| 4 | 8 | 9 | 0.44320E−02 | 225.63 |
| 5 | 10 | 11 | −0.14694E−02 | −680.56 |
| 6 | 11 | 12 | −0.10172E−01 | −98.308 |
| 7 | 12 | 13 | 0.16086E−02 | 621.67 |

First-Order Properties of Doublets

| Element Numbers | | Surface Numbers | | Power | f |
|---|---|---|---|---|---|
| 2 | 3 | 4 | 6 | 0.12647E−01 | 79.073 |

First Order Properties of Units

| Unit Number | Surface Numbers | | Power | f |
|---|---|---|---|---|
| 1 | 1 | 9 | 0.14787E−01 | 67.626 |
| 2 | 10 | 13 | −0.10044E−01 | −99.560 |

First Order Properties of the Lens

| Focus Position Number | Power | f |
|---|---|---|
| 1 | 0.13015E−01 | 76.832 |
| 2 | 0.12958E−01 | 77.170 |

TABLE 7

| Surf. No. | Type | Radius | Thickness | Glass | Clear Aperture Diameter |
|---|---|---|---|---|---|
| 1 | a | 54.5799 | 5.00000 | ACRYLIC | 90.35 |
| 2 | a | 58.6349 | 23.95383 | | 83.94 |
| 3 | | ∞ | −5.00000 | | 75.12 |
| 4 | | 62.5000 | 30.00000 | BACD5 | 75.94 |

TABLE 7-continued

| | | | | | |
|---|---|---|---|---|---|
| 5 | | −62.5000 | 6.00000 | FD1 | 73.97 |
| 6 | | −109.4412 | 7.91182 | | 71.18 |
| 7 | | ∞ | 9.00000 | | 56.98 |
| 8 | a | 1249.7090 | 7.30000 | ACRYLIC | 60.53 |
| 9 | a | −155.2043 | Space 1 | | 64.01 |
| 10 | a | −36.3132 | 4.00000 | ACRYLIC | 67.29 |
| 11 | | −40.0000 | 9.00000 | 437500 | 72.88 |
| 12 | | ∞ | 14.10000 | 563500 | 130.00 |
| 13 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −8.1440E−07 | −1.7510E−09 | −1.8974E−12 | 2.2461E−15 | −7.9927E−19 | 9.4647E−23 |
| 2 | 3.8379E−07 | −3.1875E−09 | 2.7201E−13 | 9.8151E−16 | −3.8636E−19 | 4.0804E−23 |
| 8 | −2.3042E−06 | 1.3927E−09 | −6.3058E−12 | 4.6078E−15 | −2.3532E−18 | −1.3804E−21 |
| 9 | −2.0737E−07 | −3.7147E−09 | 3.3365E−12 | −4.8130E−15 | 2.4878E−18 | −1.6154E−21 |
| 10 | −2.9061E−06 | 1.2990E−08 | −3.2841E−11 | 4.4971E−14 | −3.1733E−17 | 8.8946E−21 |

Variable Spaces

| Focus Pos. | Space 1 T(9) | Focal Shift | Image Distance |
|---|---|---|---|
| 1 | 22.008 | 0.055 | 0.000 |
| 2 | 21.625 | 0.187 | 0.000 |

First-Order Data

| Focus Position | 1 | 2 |
|---|---|---|
| f/number | 1.24 | 1.23 |
| Magnification | −0.1123 | −0.1037 |
| Object Height | −609.60 | −660.40 |
| Object Distance | −764.01 | −824.34 |
| Effective Focal Length | 76.649 | 76.989 |
| Image Distance | −.43139E−03 | −.45355E−03 |
| Overall Length | 897.28 | 957.23 |
| Forward Vertex Distance | 133.27 | 132.89 |
| Barrel Length | 133.27 | 132.89 |
| Stop Surface Number | 4 | 4 |
| Distance to Stop | 25.47 | 25.47 |
| Stop Diameter | 70.957 | 70.989 |
| Entrance Pupil Distance | 45.096 | 45.096 |
| Exit Pupil Distance | −55.080 | −54.912 |

First Order Properties of Elements

| Element Number | Surface Numbers | | Power | f |
|---|---|---|---|---|
| 1 | 1 | 2 | 0.88066E−03 | 1135.5 |
| 2 | 4 | 5 | 0.17237E−01 | 58.013 |
| 3 | 5 | 6 | −0.46962E−02 | −212.94 |
| 4 | 8 | 9 | 0.35704E−02 | 280.08 |
| 5 | 10 | 11 | −0.80382E−03 | −1244.1 |
| 6 | 11 | 12 | −0.10935E−01 | −91.449 |
| 7 | 12 | 13 | 0.16086E−02 | 621.67 |

First-Order Properties of Doublets

| Element Numbers | | Surface Numbers | | Power | f |
|---|---|---|---|---|---|
| 2 | 3 | 4 | 6 | 0.12982E−01 | 77.027 |

First Order Properties of Units

| Unit Number | Surface Numbers | | Power | f |
|---|---|---|---|---|
| 1 | 1 | 9 | 0.14792E−01 | 67.605 |
| 2 | 10 | 13 | −0.10171E−01 | −98.314 |

TABLE 7-continued

First Order Properties of the Lens

| Focus Position Number | Power | f' |
|---|---|---|
| 1 | 0.13047E-01 | 76.649 |
| 2 | 0.12989E-01 | 76.989 |

TABLE 8

| Surf. No. | Type | Radius | Thickness | Glass | Clear Aperture Diameter |
|---|---|---|---|---|---|
| 1 | a | 52.1461 | 5.00000 | ACRYLIC | 89.31 |
| 2 | a | 53.8801 | 23.19770 | | 82.48 |
| 3 | | ∞ | -2.00000 | | 74.21 |
| 4 | | 64.0000 | 30.00000 | BACD18 | 75.95 |
| 5 | | -64.0000 | 7.00000 | FD14 | 73.58 |
| 6 | | -116.2797 | 5.22161 | | 70.23 |
| 7 | | ∞ | 12.00000 | | 58.14 |
| 8 | a | -264.3354 | 7.30000 | ACRYLIC | 60.74 |
| 9 | a | -92.7348 | Space 1 | | 64.31 |
| 10 | a | -35.4960 | 4.00000 | ACRYLIC | 67.60 |
| 11 | | -40.0000 | 9.00000 | 437500 | 72.40 |
| 12 | | ∞ | 14.10000 | 563500 | 130.00 |
| 13 | | -350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | -1.5805E-06 | -1.5334E-09 | -1.8486E-12 | 2.2341E-15 | -8.0476E-19 | 9.1471E-23 |
| 2 | -6.0069E-07 | -2.7534E-09 | 1.1799E-13 | 9.9301E-16 | -3.2345E-19 | 1.0905E-23 |
| 8 | -3.9273E-06 | 1.7096E-09 | -5.6384E-12 | 3.6138E-15 | -2.0924E-18 | 5.6175E-22 |
| 9 | -1.8177E-06 | -1.9054E-09 | 2.0396E-12 | -4.0608E-15 | 3.0507E-18 | -1.0959E-21 |
| 10 | -1.6986E-06 | 1.4046E-08 | -3.5551E-11 | 4.7576E-14 | -3.1232E-17 | 8.2450E-21 |

Variable Spaces

| Focus Pos. | Space 1 T(9) | Focal Shift | Image Distance |
|---|---|---|---|
| 1 | 20.228 | -0.087 | 0.000 |
| 2 | 19.803 | 0.039 | 0.000 |

First-Order Data

| Focus Position | 1 | 2 |
|---|---|---|
| f/number | 1.23 | 1.22 |
| Magnification | -0.0963 | -0.0869 |
| Object Height | -711.20 | -787.40 |
| Object Distance | -880.38 | -971.88 |
| Effective Focal Length | 77.148 | 77.544 |
| Image Distance | 0.00 | 0.00 |
| Overall Length | 1015.4 | 1106.5 |
| Forward Vertex Distance | 135.05 | 134.62 |
| Barrel Length | 135.05 | 134.62 |
| Stop Surface Number | 4 | 4 |
| Distance to Stop | 22.87 | 22.87 |
| Stop Diameter | 71.657 | 71.760 |
| Entrance Pupil Distance | 44.279 | 44.279 |
| Exit Pupil Distance | -55.519 | -55.342 |

First Order Properties of Elements

| Element Number | Surface Numbers | | Power | f' |
|---|---|---|---|---|
| 1 | 1 | 2 | 0.59520E-03 | 1680.1 |
| 2 | 4 | 5 | 0.18205E-01 | 54.930 |
| 3 | 5 | 6 | -0.50851E-02 | -196.65 |
| 4 | 8 | 9 | 0.35052E-02 | 285.29 |
| 5 | 10 | 11 | -0.11065E-02 | -903.72 |

TABLE 8-continued

| | | | | |
|---|---|---|---|---|
| 6 | 11 | 12 | −0.10935E−01 | −91.449 |
| 7 | 12 | 13 | 0.16086E−02 | 621.67 |

First-Order Properties of Doublets

| Element Numbers | | Surface Numbers | | Power | f |
|---|---|---|---|---|---|
| 2 | 3 | 4 | 6 | 0.13575E−01 | 73.665 |

First Order Properties of Units

| Unit Number | Surface Numbers | | Power | f |
|---|---|---|---|---|
| 1 | 1 | 9 | 0.14914E−01 | 67.050 |
| 2 | 10 | 13 | −0.10474E−01 | −95.471 |

First Order Properties of the Lens

| Focus Position Number | Power | f |
|---|---|---|
| 1 | 0.12962E−01 | 77.148 |
| 2 | 0.12896E−01 | 77.544 |

TABLE 8B

| Surf. No. | Type | Radius | Thickness | Glass | Clear Aperture Diameter |
|---|---|---|---|---|---|
| 1 | a | 52.1461 | 5.00000 | ACRYLIC | 89.31 |
| 2 | a | 53.8801 | 23.19770 | | 82.48 |
| 3 | | ∞ | −2.00000 | | 74.21 |
| 4 | | 64.0000 | 30.00000 | BACD18 | 75.95 |
| 5 | | −64.0000 | 7.00000 | FD14 | 73.58 |
| 6 | | −116.2797 | 5.22161 | | 70.23 |
| 7 | | ∞ | 12.00000 | | 58.14 |
| 8 | a | −264.3354 | 7.30000 | ACRYLIC | 60.74 |
| 9 | a | −92.7348 | Space 1 | | 64.31 |
| 10 | a | −35.3700 | 4.00000 | ACRYLIC | 67.60 |
| 11 | | −40.0000 | 9.00000 | 437500 | 72.40 |
| 12 | | ∞ | 14.10000 | 563500 | 130.00 |
| 13 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.5805E−06 | −1.5334E−09 | −1.8486E−12 | 2.2341E−15 | −8.0476E−19 | 9.1471E−23 |
| 2 | −6.0069E−07 | −2.7534E−09 | 1.1799E−13 | 9.9301E−16 | −3.2345E−19 | 1.0905E−23 |
| 8 | −3.9273E−06 | 1.7096E−09 | −5.6384E−12 | 3.6138E−15 | −2.0924E−18 | 5.6175E−22 |
| 9 | −1.8177E−06 | −1.9054E−09 | 2.0396E−12 | −4.0608E−15 | 3.0507E−18 | −1.0959E−21 |
| 10 | −1.6986E−06 | 1.4046E−08 | −3.5551E−11 | 4.7576E−14 | −3.1232E−17 | 8.2450E−21 |

Variable Spaces

| Focus Pos. | Space 1 T(9) | Focal Shift | Image Distance |
|---|---|---|---|
| 1 | 20.020 | 0.000 | 0.000 |
| 2 | 19.580 | 0.100 | 0.001 |

First-Order Data

| Focus Position | 1 | 2 |
|---|---|---|
| f/number | 1.23 | 1.22 |
| Magnification | −0.0963 | −0.0869 |
| Object Height | −711.20 | −787.40 |
| Object Distance | −876.74 | −968.09 |
| Effective Focal Length | 76.802 | 77.217 |
| Image Distance | 0.24545E−03 | 0.79645E−03 |
| Overall Length | 1011.6 | 1102.5 |

TABLE 8B-continued

| | | |
|---|---|---|
| Forward Vertex Distance | 134.84 | 134.40 |
| Barrel Length | 134.84 | 134.40 |
| Stop Surface Number | 4 | 4 |
| Distance to Stop | 22.87 | 22.87 |
| Stop Diameter | 71.194 | 71.322 |
| Entrance Pupil Distance | 44.248 | 44.248 |
| Exit Pupil Distance | −55.170 | −54.987 |

First Order Properties of Elements

| Element Number | Surface Numbers | | Power | f' |
|---|---|---|---|---|
| 1 | 1 | 2 | 0.60240E−03 | 1660.0 |
| 2 | 4 | 5 | 0.18363E−01 | 54.457 |
| 3 | 5 | 6 | −0.51837E−02 | −192.91 |
| 4 | 8 | 9 | 0.35374E−02 | 282.69 |
| 5 | 10 | 11 | −0.11621E−02 | −860.50 |
| 6 | 11 | 12 | −0.11048E−01 | −90.518 |
| 7 | 12 | 13 | 0.16251E−02 | 615.33 |

First-Order Properties of Doublets

| Element Numbers | | Surface Numbers | | Power | f' |
|---|---|---|---|---|---|
| 2 | 3 | 4 | 6 | 0.13648E−01 | 73.268 |

First Order Properties of Units

| Unit Number | Surface Numbers | | Power | f' |
|---|---|---|---|---|
| 1 | 1 | 9 | 0.14990E−01 | 66.709 |
| 2 | 10 | 13 | −0.10626E−01 | −94.105 |

First Order Properties of the Lens

| Focus Position Number | Power | f' |
|---|---|---|
| 1 | 0.13021E−01 | 76.802 |
| 2 | 0.12950E−01 | 77.217 |

TABLE 8R

| Surf. No. | Type | Radius | Thickness | Glass | Clear Aperture Diameter |
|---|---|---|---|---|---|
| 1 | a | 52.1461 | 5.00000 | ACRYLIC | 89.31 |
| 2 | a | 53.8801 | 23.19770 | | 82.48 |
| 3 | | ∞ | −2.00000 | | 74.21 |
| 4 | | 64.0000 | 30.00000 | BACD18 | 75.95 |
| 5 | | −64.0000 | 7.00000 | FD14 | 73.58 |
| 6 | | −116.2797 | 5.22161 | | 70.23 |
| 7 | | ∞ | 12.00000 | | 58.14 |
| 8 | a | −264.3354 | 7.30000 | ACRYLIC | 60.74 |
| 9 | a | −92.7348 | Space 1 | | 64.31 |
| 10 | a | −35.6500 | 4.00000 | ACRYLIC | 67.60 |
| 11 | | −40.0000 | 9.00000 | 437500 | 72.40 |
| 12 | | ∞ | 14.10000 | 563500 | 130.00 |
| 13 | | −350.0000 | Image distance | | 130.00 |

Symbol Description
a - Polynomial asphere

Even Polynomial Aspheres

| Surf. No. | D | E | F | G | H | I |
|---|---|---|---|---|---|---|
| 1 | −1.5805E−06 | −1.5334E−09 | −1.8486E−12 | 2.2341E−15 | −8.0476E−19 | 9.1471E−23 |
| 2 | −6.0069E−07 | −2.7534E−09 | 1.1799E−13 | 9.9301E−16 | −3.2345E−19 | 1.0905E−23 |
| 8 | −3.9273E−06 | 1.7096E−09 | −5.6384E−12 | 3.6138E−15 | −2.0924E−18 | 5.6175E−22 |
| 9 | −1.8177E−06 | −1.9054E−09 | 2.0396E−12 | −4.0608E−15 | 3.0507E−18 | −1.0959E−21 |
| 10 | −1.6986E−06 | 1.4046E−08 | −3.5551E−11 | 4.7576E−14 | −3.1232E−17 | 8.2450E−21 |

TABLE 8R-continued

Variable Spaces

| Focus Pos. | Space 1 T(9) | Focal Shift | Image Distance |
|---|---|---|---|
| 1 | 20.450 | −0.180 | −0.010 |
| 2 | 20.000 | −0.080 | −0.005 |

First-Order Data

| Focus Position | 1 | 2 |
|---|---|---|
| f/number | 1.23 | 1.22 |
| Magnification | −0.0963 | −0.0869 |
| Object Height | −711.20 | −787.40 |
| Object Distance | −884.01 | −976.13 |
| Effective Focal Length | 77.494 | 77.910 |
| Image Distance | −.10365E−01 | −.45926E−02 |
| Overall Length | 1019.3 | 1110.9 |
| Forward Vertex Distance | 135.26 | 134.81 |
| Barrel Length | 135.27 | 134.82 |
| Stop Surface Number | 4 | 4 |
| Distance to Stop | 22.87 | 22.87 |
| Stop Diameter | 72.122 | 72.258 |
| Entrance Pupil Distance | 44.308 | 44.308 |
| Exit Pupil Distance | −55.880 | −55.690 |

First Order Properties of Elements

| Element Number | Surface Numbers | | Power | f' |
|---|---|---|---|---|
| 1 | 1 | 2 | 0.58853E−03 | 1699.2 |
| 2 | 4 | 5 | 0.18054E−01 | 55.390 |
| 3 | 5 | 6 | −0.49975E−02 | −200.10 |
| 4 | 8 | 9 | 0.34753E−02 | 287.75 |
| 5 | 10 | 11 | −0.10421E−02 | −959.58 |
| 6 | 11 | 12 | −0.10829E−01 | −92.345 |
| 7 | 12 | 13 | 0.15930E−02 | 627.76 |

First-Order Properties of Doublets

| Element Numbers | | Surface Numbers | Power | f' |
|---|---|---|---|---|
| 2 | 3 | 4   6 | 0.13499E−01 | 74.079 |

First Order Properties of Units

| Unit Number | Surface Numbers | | Power | f' |
|---|---|---|---|---|
| 1 | 1 | 9 | 0.14837E−01 | 67.400 |
| 2 | 10 | 13 | −0.10319E−01 | −96.909 |

First Order Properties of the Lens

| Focus Position Number | Power | f' |
|---|---|---|
| 1 | 0.12904E−01 | 77.494 |
| 2 | 0.12835E−01 | 77.910 |

TABLE 9

| Ex. No. | F0 | F1 | F2 | F3 | F4 | F0/F1 | F0/F2 | F0/F3 | F0/|F4| |
|---|---|---|---|---|---|---|---|---|---|
| 1 | 77.114 | 1100.2 | 83.942 | 199.580 | −99.978 | 0.07009 | 0.91866 | 0.38638 | 0.77131 |
| 1B | 76.755 | 1088.2 | 83.263 | 197.77 | −98.844 | 0.07053 | 0.92184 | 0.38810 | 0.77653 |
| 1R | 77.424 | 1111.6 | 84.609 | 201.29 | −101.25 | 0.06966 | 0.91508 | 0.38464 | 0.76468 |
| 2 | 77.536 | 1506.3 | 83.857 | 227.020 | −120.95 | 0.05147 | 0.92462 | 0.34154 | 0.64106 |
| 3 | 71.446 | 1248.2 | 79.212 | 174.610 | −94.873 | 0.05724 | 0.90196 | 0.40917 | 0.75307 |
| 4 | 66.686 | 1219.8 | 72.973 | 158.950 | −87.122 | 0.05467 | 0.91384 | 0.41954 | 0.76543 |
| 5 | 82.274 | 4730.3 | 86.146 | 237.050 | −112.51 | 0.01739 | 0.95505 | 0.34707 | 0.73126 |
| 6 | 76.832 | 1599.8 | 79.073 | 225.630 | −99.560 | 0.04803 | 0.97166 | 0.34052 | 0.77172 |
| 7 | 76.649 | 1135.5 | 77.027 | 280.080 | −98.314 | 0.06750 | 0.99509 | 0.27367 | 0.77963 |
| 8 | 77.148 | 1680.1 | 73.665 | 285.290 | −95.471 | 0.04592 | 1.04728 | 0.27042 | 0.80808 |

TABLE 9-continued

| Ex. No. | F0 | F1 | F2 | F3 | F4 | F0/F1 | F0/F2 | F0/F3 | F0/|F4| |
|---|---|---|---|---|---|---|---|---|---|
| 8B | 76.802 | 1660.0 | 73.268 | 282.69 | −94.105 | 0.04627 | 1.04823 | 0.27168 | 0.81613 |
| 8R | 77.494 | 1699.2 | 74.079 | 287.75 | −96.909 | 0.04560 | 1.04610 | 0.26931 | 0.79965 |
| '681, ex III | 68.2 | 501.471 | 76.201 | 246.209 | −98.271 | 0.13510 | 0.89500 | 0.27700 | 0.69310 |
| '681, ex V | 84.3 | 384.932 | 89.206 | 669.048 | −125.446 | 0.21810 | 0.94500 | 0.12510 | 0.67200 |

TABLE 10

Best-Fit Spherical Radii

| Ex. No. | R11 | R12 | R21 | R22 | R31 | R32 |
|---|---|---|---|---|---|---|
| 1 | 147.60 | 86.170 | 66.567 | −172.399 | −162.10 | −80.320 |
| 1B | 147.60 | 86.170 | 66.567 | −172.399 | −162.10 | −80.320 |
| 1R | 147.60 | 86.170 | 66.567 | −172.399 | −162.10 | −80.320 |
| 2 | 129.10 | 77.530 | 66.592 | −171.528 | −1224.0 | −133.60 |
| 3 | 101.10 | 67.620 | 59.643 | −192.524 | −307.10 | −90.550 |
| 4 | 92.350 | 62.300 | 54.153 | −184.843 | −86.030 | −57.400 |
| 5 | 182.30 | 93.350 | 73.800 | −149.627 | −220.50 | −108.30 |
| 6 | 165.80 | 79.110 | 67.730 | −119.214 | −91.610 | −57.710 |
| 7 | 167.30 | 83.640 | 62.500 | −109.441 | −113.70 | −65.590 |
| 8 | 146.30 | 98.330 | 64.000 | −116.280 | −75.400 | −57.040 |
| 8B | 146.30 | 98.330 | 64.000 | −116.280 | −75.400 | −57.040 |
| 8R | 146.30 | 98.330 | 64.000 | −116.280 | −75.400 | −57.040 |
| '681, ex III | 193.0 | 168.30 | 81.03 | −93.225 | −199.1 | −110.7 |
| '681, ex V | 74.32 | 96.02 | 69.47 | −119.732 | −234.5 | −319.8 |

TABLE 11

| Ex. No. | T12/F0 | T23/F0 | T34/F0 | |R22|/R21 | T3/F0 |
|---|---|---|---|---|---|
| 1 | 0.317 | 0.256 | 0.352 | 2.590 | 0.095 |
| 1B | 0.318 | 0.257 | 0.347 | 2.590 | 0.095 |
| 1R | 0.315 | 0.255 | 0.358 | 2.590 | 0.095 |
| 2 | 0.346 | 0.225 | 0.397 | 2.576 | 0.077 |
| 3 | 0.376 | 0.274 | 0.353 | 3.228 | 0.098 |
| 4 | 0.380 | 0.238 | 0.350 | 3.413 | 0.120 |
| 5 | 0.329 | 0.307 | 0.380 | 2.027 | 0.079 |
| 6 | 0.230 | 0.221 | 0.331 | 1.760 | 0.095 |
| 7 | 0.247 | 0.221 | 0.287 | 1.751 | 0.095 |
| 8 | 0.275 | 0.223 | 0.262 | 1.817 | 0.095 |
| 8B | 0.276 | 0.224 | 0.261 | 1.817 | 0.095 |
| 8R | 0.274 | 0.222 | 0.264 | 1.817 | 0.094 |
| '681, ex III | 0.254 | 0.372 | 0.316 | 1.150 | 0.117 |
| '681, ex V | 0.263 | 0.160 | 0.398 | 1.724 | 0.095 |

What is claimed is:

1. A projection lens system for use in a projection television which has a screen and a first cathode ray tube which produces light of primarily a first color, a second cathode ray tube which produces light of primarily a second color, and a third cathode ray tube which produces light of primarily a third color, said projection lens system comprising three projection lenses, one projection lens being associated with each of the cathode ray tubes during use of the system for forming an image of the light produced by that tube on the screen, each projection lens consisting of:

(A) a first lens unit on the long conjugate side of the lens, said first lens unit having a positive power; and
(B) a second lens unit which (i) is associated with a cathode ray tube during use of the lens, (ii) has a strong negative power when so associated, and (iii) provides most of the correction of the lens' field curvature;
wherein in addition to any difference based on satisfying the Scheimpflug condition or any difference in spectral transmission, the second lens unit of the second projection lens differs from the second lens unit of the first projection lens in at least one optical property, said difference being based on said first and second colors.

2. The projection lens system of claim 1 wherein:
(i) the second lens unit of the first projection lens comprises a first meniscus element and the second lens unit of the second projection lens comprises a second meniscus element; and
(ii) said difference between the second lens units comprises a difference between the first meniscus element and the second meniscus element in at least one optical property other than spectral transmission.

3. The projection lens system of claim 2 wherein said difference in meniscus elements results from at least one of:
(i) a difference in focal length,
(ii) a difference in index of refraction,
(iii) a difference in base radius for the screen side surfaces of the elements,
(iv) a difference in base radius for the cathode ray tube side surfaces of the elements,
(v) where the elements have aspherical screen side surfaces, a difference in best-fit spherical radii for said screen side surfaces,
(vi) where the elements have aspherical cathode ray tube side surfaces, a difference in best-fit spherical radii for said cathode ray tube side surfaces,
(vii) where the elements have aspherical screen side surfaces, a difference in shape for said screen side surfaces, and/or
(viii) where the elements have aspherical cathode ray tube side surfaces, a difference in shape for said cathode ray tube side surfaces.

4. The projection lens system of claim 2 wherein the first and second meniscus elements additionally differ from one another in spectral transmission.

5. The projection lens system of claim 4 wherein:
(i) the second lens unit of the third projection lens comprises a third meniscus element; and
(ii) the third meniscus element differs from each of the first and second meniscus elements in spectral transmission.

6. The projection lens system of claim 5 wherein:
(i) the first color is green, the second color is red, and the third color is blue; and
(ii) the first meniscus element is green-colored, the second meniscus element is red-colored, and the third meniscus element is clear.

7. The projection lens system of claim 1 wherein:
(i) the second lens unit of the first projection lens comprises a first coupling fluid portion and the second lens unit of the second projection lens comprises a second coupling fluid portion; and
(ii) said difference between the second lens units comprises a difference between the first coupling fluid portion and the second coupling fluid portion in at least one optical property other than spectral transmission.

8. The projection lens system of claim 7 wherein said difference in coupling fluid portions results from at least a difference in axial thickness.

9. The projection lens system of claim 1 wherein the first lens units of the first and second projection lenses are identical to within manufacturing tolerances.

10. The projection lens system of claim 1 wherein the first color is green and the second color is red or blue.

11. The projection lens system of claim 1 wherein the second lens units of the first and second projection lenses additionally differ from one another in spectral transmission.

12. The projection lens system of claim 1 wherein the second lens unit of the third projection lens differs from each of the second lens units of the first and second projection lenses in spectral transmission.

13. A projection lens system for use in a projection television which has a screen and a first cathode ray tube which produces light of primarily a first color, a second cathode ray tube which produces light of primarily a second color, and a third cathode ray tube which produces light of primarily a third color, said projection lens system comprising three projection lenses, one projection lens being associated with each of the cathode ray tubes during use of the system for forming an image of the light produced by that tube on the screen, each projection lens consisting of:
(A) a first lens unit on the long conjugate side of the lens, said first lens unit having a positive power; and
(B) a second lens unit which (i) is associated with a cathode ray tube during use of the lens, (ii) has a strong negative power when so associated, and (iii) provides most of the correction of the lens' field curvature;
wherein in addition to any differences based on satisfying the Scheimpflug condition or any differences in spectral transmission, the second lens units of the first, second, and third projection lenses differ from one another in at least one optical property, said differences being based on said first, second, and third colors.

14. The projection lens system of claim 13 wherein:
(i) the second lens units of the first, second, and third projection lenses each comprises a meniscus element; and
(ii) said differences between the second lens units comprise differences between said meniscus elements in at least one optical property other than spectral transmission.

15. The projection lens system of claim 14 wherein said differences in meniscus elements result from at least one of:
(i) a difference in focal length between at least two of the elements,
(ii) a difference in index of refraction between at least two of the elements,
(iii) a difference in base radius for the screen side surfaces of at least two of the elements,
(iv) a difference in base radius for the cathode ray tube side surfaces of at least two of the elements,
(v) where at least two of the elements have aspherical screen side surfaces, a difference in best-fit spherical radii for said screen side surfaces,
(vi) where at least two of the elements have aspherical cathode ray tube side surfaces, a difference in best-fit spherical radii for said cathode ray tube side surfaces,
(vii) where at least two of the elements have aspherical screen side surfaces, a difference in shape for said screen side surfaces, and/or
(viii) where at least two of the elements have aspherical cathode ray tube side surfaces, a difference in shape for said cathode ray tube side surfaces.

16. The projection lens system of claim 14 wherein the meniscus elements additionally differ from one another in spectral transmission.

17. The projection lens system of claim 16 wherein:
(i) the first color is green, the second color is red, and the third color is blue; and
(ii) the meniscus element of the first projection lens is green-colored, the meniscus element of the second projection lens is red-colored, and the meniscus element of the third projection lens is clear.

18. The projection lens system of claim 13 wherein:
(i) the second lens units of the first, second, and third projection lens each comprises a coupling fluid portion; and
(ii) said differences between the second lens units comprise differences between said coupling fluid portions in at least one optical property other than spectral transmission.

19. The projection lens system of claim 18 wherein said differences in coupling fluid portions result from at least a difference in axial thickness between at least two of the coupling fluid portions.

20. The projection lens system of claim 13 wherein the first lens units of the first, second, and third projection lenses are substantially identical to within manufacturing tolerances.

21. The projection lens system of claim 13 wherein the first color is green, the second color is red, and the third color is blue.

22. The projection lens system of claim 13 wherein the second lens units of the first, second, and third projection lenses additionally differ from one another in spectral transmission.

23. A projection lens for use in combination with a cathode ray tube and having a long conjugate side, a short conjugate side, and a focal length F0 when associated with the cathode ray tube, said lens consisting in order from its long conjugate side of:
(A) a positive first lens unit which consists in order from the lens' long conjugate side of:
(i) a first lens subunit which consists of a first lens element which has at least one aspherical surface and a weak power;
(ii) a second lens subunit which provides most of the positive power of the projection lens and consists of a second lens element or a doublet; and
(iii) a third lens subunit which consists of a third lens element which has at least one aspherical surface and a positive paraxial power; and
(B) a second lens unit which (i) is associated with the cathode ray tube during use of the lens, (ii) has a strong negative power when so associated, and (iii) provides most of the correction of the lens' field curvature;
wherein:
(a) the second lens subunit has a radius R21 in the direction of the lens' long conjugate side and a radius R22 in the direction of the lens' short conjugate side;
(b) $|R22|/R21 \geq 1.5$;
(c) the third lens element has an axial thickness T3, a best-fit spherical radius R31 in the direction of the lens' long conjugate side, and a best-fit spherical radius R32 in the direction of the lens' short conjugate side;
(d) R31<0;
(e) R32<0;
|R31|>|R32|; and
(g) $T3/F0 \leq 0.13$.

24. A projection lens for use in combination with a cathode ray tube and having a long conjugate side, a short conjugate side, and a focal length F0 when associated with the cathode ray tube, said lens consisting in order from its long conjugate side of:

(A) a positive first lens unit which consists in order from the lens' long conjugate side of:

(i) a first lens subunit which consists of a first lens element which has at least one aspherical surface and a weak power;

(ii) a second lens subunit which provides most of the positive power of the projection lens and consists of a second lens element or a doublet; and (iii) a third lens subunit which consists of a third lens element which has at least one aspherical surface and a positive paraxial power; and (B) a second lens unit which (i) is associated with the cathode ray tube during use of the lens, (ii) has a strong negative power when so associated, and (iii) provides most of the correction of the lens' field curvature;

wherein:

(a) the second lens subunit has a radius R21 in the direction of the lens' long conjugate side and a radius R22 in the direction of the lens' short conjugate side;

(b) $|R22|/R21 \geq 1.5$;

(c) the third lens element has a best-fit spherical radius R31 in the direction of the lens' long conjugate side and a best-fit spherical radius R32 in the direction of the lens' short conjugate side;

(d) R31<0;

(e) R32<0;

(f) $|R31|>|R32|$; and (g) the second lens unit comprises a meniscus element which is concave to the lens' long conjugate side.

25. A projection lens for use in combination with a cathode ray tube and having a long conjugate side, a short conjugate side, and a focal length F0 when associated with the cathode ray tube, said lens consisting in order from its long conjugate side of:

(A) a positive first lens unit which consists in order from the lens' long conjugate side of:

(i) a first lens subunit which consists of a first lens element which has at least one aspherical surface and a weak power;

(ii) a second lens subunit which provides most of the positive power of the projection lens and consists of a second lens element or a doublet; and (iii) a third lens subunit which consists of a third lens element which has at least one aspherical surface and a positive paraxial power; and (B) a second lens unit which (i) is associated with the cathode ray tube during use of the lens, (ii) has a strong negative power when so associated, and (iii) provides most of the correction of the lens' field curvature;

wherein:

(a) the second lens subunit is axially spaced from the third lens element by a distance T23;

(b) the third lens element has an axial thickness T3, a best-fit spherical radius R31 in the direction of the lens' long conjugate side, and a best-fit spherical radius R32 in the direction of the lens' short conjugate side;

(c) the third lens element is axially spaced from the second lens unit by a distance T34;

(d) R31<0;

(e) R32<0;

(f) $|R31|>|R32|$;

(g) $T23 \leq T34$; and (h) $T3/F0 \leq 0.13$.

26. A projection lens for use in combination with a cathode ray tube and having a long conjugate side, a short conjugate side, and a focal length F0 when associated with the cathode ray tube, said lens consisting in order from its long conjugate side of:

(A) a positive first lens unit which consists in order from the lens' long conjugate side of:

(i) a first lens subunit which consists of a first lens element which has at least one aspherical surface and a weak power;

(ii) a second lens subunit which provides most of the positive power of the projection lens and consists of a second lens element or a doublet; and (iii) a third lens subunit which consists of a third lens element which has at least one aspherical surface and a positive paraxial power; and (B) a second lens unit which (i) is associated with the cathode ray tube during use of the lens, (ii) has a strong negative power when so associated, and (iii) provides most of the correction of the lens' field curvature;

wherein:

(a) the second lens subunit is axially spaced from the third lens element by a distance T23;

(b) the third lens element has a best-fit spherical radius R31 in the direction of the lens' long conjugate side and a best-fit spherical radius R32 in the direction of the lens' short conjugate side;

(c) the third lens element is axially spaced from the second lens unit by a distance T34;

(d) R31<0;

(e) R32<0;

(f) $|R31|>|R32|$;

(g) $T23 \leq T34$; and (h) the second lens unit comprises a meniscus element which is concave to the lens' long conjugate side.

27. A projection lens for use in combination with a cathode ray tube and having a long conjugate side, a short conjugate side, and a focal length F0 when associated with the cathode ray tube, said lens consisting in order from its long conjugate side of:

(A) a positive first lens unit which consists in order from the lens' long conjugate side of:

(i) a first lens subunit which consists of a first lens element which has at least one aspherical surface and a weak power;

(ii) a second lens subunit which provides most of the positive power of the projection lens and consists of a second lens element or a doublet; and (iii) a third lens subunit which consists of a third lens element which has at least one aspherical surface and a positive paraxial power; and (B) a second lens unit which (i) is associated with the cathode ray tube during use of the lens, (ii) has a strong negative power when so associated, and (iii) provides most of the correction of the lens' field curvature;

wherein:

(a) the second lens subunit has a radius R21 in the direction of the lens' long conjugate side and a radius R22 in the direction of the lens' short conjugate side;

(b) $|R22|/R21 \geq 1.5$;
(c) the second lens subunit is axially spaced from the third lens element by a distance T23;
(d) the third lens element has an axial thickness T3, a best-fit spherical radius R31 in the direction of the lens' long conjugate side, and a best-fit spherical radius R32 in the direction of the lens' short conjugate side;
(e) $R31<0$;
(f) $R32<0$;
(g) $|R31|>|R32|$;
(h) $T3/F0 \leq 0.13$;
(i) the third lens element is axially spaced from the second lens unit by a distance T34;
(j) $T23 \leq T34$; and
(k) the second lens unit comprises a meniscus element which is concave to the lens' long conjugate side.

28. The projection lens of claim 23, 24, or 27 wherein:
(i) the first lens element has a best-fit spherical radius R11 in the direction of the lens' long conjugate side and a best-fit spherical radius R12 in the direction of the lens' short conjugate side;
(ii) $R11>0$;
(iii) $R12>0$; and
(iv) $R11>R12$.

29. The projection lens of claim 25, 26, or 27 wherein: $T23 \geq 0.15 \, F0$.

30. The projection lens of claim 24, 26, or 27 wherein the meniscus element of the second lens unit is composed of plastic.

31. The projection lens of claim 23, 24, 25, 26, or 27 wherein:
(i) the first lens element has a best-fit spherical radius R11 in the direction of the lens' long conjugate side and a best-fit spherical radius R12 in the direction of the lens' short conjugate side;
(ii) $R11>0$; and
(iii) $R12>0$.

32. The projection lens of claim 23, 24, 25, 26, or 27 wherein the second lens subunit has a focal length F2 and $F0/F2 \geq 0.9$.

33. The projection lens of claim 23, 24, 25, 26, or 27 wherein the third lens element has a focal length F3 and $F0/F3 \leq 0.42$.

34. The projection lens of claim 23, 24, 25, 26, or 27 wherein the second lens unit has a focal length F4 and $0.64 \leq F0/|F4| < 0.85$.

35. The projection lens of claim 23, 24, 25, 26, or 27 wherein the second lens subunit is composed of glass.

36. The projection lens of claim 23, 24, 25, 26, or 27 wherein the first lens element and the third lens elements are composed of plastic.

37. The projection lens of claim 23, 24, 25, 26, or 27 wherein the lens has a half angle field of view in the direction of the lens' long conjugate of at least 35 degrees.

38. The projection lens of claim 23, 24, 25, 26, or 27 wherein the f-number of the lens for an infinite conjugate is less than 1.5.

39. A projection television set comprising a cathode ray tube, a screen, and a projection lens for projecting light from the cathode ray tube onto the screen to form an image, said projection lens comprising the projection lens of claim 23, 24, 25, 26, or 27.

40. A projection television set comprising three cathode ray tubes, a screen, and three projection lenses, one projection lens being associated with each of the cathode ray tubes for projecting light from that tube onto the screen to form an image, each projection lens comprising the projection lens of claim 23, 24, 25, 26, or 27.

41. A projection television set comprising three cathode ray tubes, a screen, and a projection lens system comprising the projection lens system of claim 1 or 13.

* * * * *